US012791883B2

(12) United States Patent
Watanabe et al.

(10) Patent No.: US 12,791,883 B2
(45) Date of Patent: Nov. 10, 2026

(54) DATA CREATION DEVICE, OPTICAL CONTROL DEVICE, TARGET INTENSITY SPECTROGRAM CREATION DEVICE, DATA CREATION METHOD, TARGET INTENSITY SPECTROGRAM CREATION METHOD, DATA CREATION PROGRAM, AND TARGET INTENSITY SPECTROGRAM CREATION PROGRAM

(71) Applicant: HAMAMATSU PHOTONICS K.K., Hamamatsu (JP)

(72) Inventors: Koyo Watanabe, Hamamatsu (JP); Takashi Inoue, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 378 days.

(21) Appl. No.: 18/702,452

(22) PCT Filed: Oct. 12, 2022

(86) PCT No.: PCT/JP2022/038102
§ 371 (c)(1),
(2) Date: Apr. 18, 2024

(87) PCT Pub. No.: WO2023/074379
PCT Pub. Date: May 4, 2023

(65) Prior Publication Data

US 2025/0264738 A1 Aug. 21, 2025

(30) Foreign Application Priority Data

Nov. 1, 2021 (JP) ................................ 2021-178837

(51) Int. Cl.
*G02F 1/01* (2006.01)
*G01J 3/28* (2006.01)

(52) U.S. Cl.
CPC .............. *G02F 1/0121* (2013.01); *G01J 3/28* (2013.01)

(58) Field of Classification Search
CPC ...... G02F 1/01; G02F 1/0121; G02F 2203/12; G02F 2203/26; G03H 1/0005;
(Continued)

(56) References Cited

U.S. PATENT DOCUMENTS

2004/0133372 A1 7/2004 Dorrer et al.
2010/0141857 A1 6/2010 Wada et al.
2019/0204626 A1 7/2019 Watanabe et al.

FOREIGN PATENT DOCUMENTS

JP 2013-170905 A 9/2013
JP 2015-206707 A 11/2015
JP 2018-036486 A 3/2018

OTHER PUBLICATIONS

European Search Report issued on Aug. 26, 2025 in corresponding European patent application 22886708.1.
(Continued)

*Primary Examiner* — Jack Dinh
(74) *Attorney, Agent, or Firm* — Faegre Drinker Biddle & Reath LLP

(57) ABSTRACT

A Fourier transform unit transforms a first waveform function in the frequency domain into a second waveform function in the temporal domain. An STFT unit transforms the second waveform function into an intensity spectrogram and a phase spectrogram. A spectrogram replacement unit replaces the intensity spectrogram with an intensity spectrogram generated in advance and constrains the phase spectrogram. An inverse STFT unit transforms the intensity spectrogram after replacement and the phase spectrogram after constraint into a third waveform function in the temporal domain. An inverse Fourier transform unit transforms
(Continued)

the third waveform function into a fourth waveform function in the frequency domain.

13 Claims, 31 Drawing Sheets

(58) Field of Classification Search
CPC ............... G03H 1/0808; G03H 1/2294; G03H 2222/33; G03H 2223/23
See application file for complete search history.

(56) References Cited

OTHER PUBLICATIONS

Dorrer, C. et al., "Simultaneous temporal characterization of telecommunication optical pulses and modulators by use of spectrograms," Optics Letters, Aug. 1, 2002, vol. 27, No. 1, pp. 1315-1317.
Hacker, M. et al., "Iterative Fourier transform algorithm for phase-only pulse shaping," Optics Express, Aug. 13, 2001 (vol. 9, No. 4), pp. 191-199.
Ripoll, Olivier et al., "Review of iterative Fourier-transform algorithms for beam shaping applications," Optical Engineering, Nov. 2004 (vol. 43, No. 11), pp. 2549-2556.
International Preliminary Report on Patentability mailed May 16, 2024 for PCT/JP2022/038102.

DATA CREATION DEVICE, OPTICAL CONTROL DEVICE, TARGET INTENSITY SPECTROGRAM CREATION DEVICE, DATA CREATION METHOD, TARGET INTENSITY SPECTROGRAM CREATION METHOD, DATA CREATION PROGRAM, AND TARGET INTENSITY SPECTROGRAM CREATION PROGRAM

TECHNICAL FIELD

The present disclosure relates to a data generation device, a light control device, a target intensity spectrogram generation device, a data generation method, a target intensity spectrogram generation method, a data generation program, and a target intensity spectrogram generation program.

BACKGROUND ART

Patent Literature 1 and Non Patent Literature 1 disclose a technique for shaping an optical pulse by modulating the spectral phase and/or the spectral intensity using a spatial light modulator (SLM). In Non Patent Literature 1, the spectral phase and the spectral intensity for obtaining a desired optical pulse waveform are calculated by using an iterative Fourier method. In Patent Literature 1, wavelength components, in other words, frequency components, of light forming the temporal intensity waveform are controlled.

CITATION LIST

Patent Literature

Patent Literature 1: Japanese Unexamined Patent Publication No. 2018-036486

Non Patent Literature

Non Patent Literature 1: M. Hacker, G. Stobrawa, T. Feurer, "Iterative Fourier transform algorithm for phase-only pulse shaping", Optics Express, Vol. 9, No. 4, pp. 191 to 199, 13 Aug. 2001

Non Patent Literature 2: Olivier Ripoll, Ville Kettunen, Hans Peter Herzig, "Review of iterative Fourier transform algorithms for beam shaping applications", Optical Engineering, Vol. 43, No. 11, pp. 2549 to 2556 November 2004

SUMMARY OF INVENTION

Technical Problem

For example, as a technique for controlling the temporal waveforms of various optical pulses such as ultrashort optical pulses, there is a technique in which the spectral phase and the spectral intensity of the optical pulse are modulated by the SLM. In such a technique, a spectral phase and a spectral intensity for approximating the temporal intensity waveform of the optical pulse to a desired waveform are calculated, and a modulation pattern for applying the spectral phase and the spectral intensity to the optical pulse is presented to the SLM.

In such conventional techniques, only the shape of the temporal intensity waveform can be controlled, but it is not possible to control the wavelength components, in other words, frequency components, of light forming the temporal intensity waveform. In contrast, the technique described in Patent Literature 1 makes it possible to control the wavelength components (frequency components) of light forming the temporal intensity waveform. For example, when generating output light that includes a plurality of optical pulses, applications to various devices, such as a laser processing device, an ultra-high-speed imaging camera, and a terahertz wave generator, are possible by changing the wavelength for each optical pulse. However, the technique described in Patent Literature 1 has a problem that it takes a long time to calculate modulation data for approximating the temporal intensity waveform of the optical pulse to the desired waveform.

It is an object of the present disclosure to provide a data generation device, a light control device, a data generation method, and a data generation program that can shorten the time required to calculate modulation data for approximating the temporal intensity waveform of an optical pulse to a desired waveform. In addition, it is an object of the present disclosure to provide a target intensity spectrogram generation device, a target intensity spectrogram generation method, and a target intensity spectrogram generation program that can generate a target intensity spectrogram for making the center wavelength different for each optical pulse.

Solution to Problem

A form of data generation device is a device that generates data for controlling an SLM. The data generation device includes a first transform unit, a second transform unit, a spectrogram replacement unit, a third transform unit, a fourth transform unit, and a data generator. The first transform unit transforms a first waveform function in a frequency domain including an intensity spectrum function and a phase spectrum function into a second waveform function in a temporal domain including a temporal intensity waveform function and a temporal phase waveform function. The second transform unit transforms the second waveform function into an intensity spectrogram and a phase spectrogram. The spectrogram replacement unit replaces the intensity spectrogram with a target intensity spectrogram generated in advance and constrains the phase spectrogram. The third transform unit transforms the replaced intensity spectrogram and the constrained phase spectrogram into a third waveform function in the temporal domain including a temporal intensity waveform function and a temporal phase waveform function. The fourth transform unit transforms the third waveform function into a fourth waveform function in the frequency domain including an intensity spectrum function and a phase spectrum function. In the data generation device, the first transform unit, the second transform unit, the third transform unit, and the fourth transform unit repeatedly perform their operations in this order while replacing the first waveform function of the first transform unit with the fourth waveform function in the fourth transform unit. The data generator generates the data based on the phase spectrum function of the fourth waveform function obtained after the repeated operations.

A form of data generation method is a method for generating data for controlling an SLM. The data generation method includes a first transform step, a second transform step, a spectrogram replacement step, a third transform step, a fourth transform step, and a data generation step. In the first transform step, a first waveform function in a frequency domain including an intensity spectrum function and a phase spectrum function is transformed into a second waveform function in a temporal domain including a temporal intensity waveform function and a temporal phase waveform function. In the second transform step, the second waveform function is transformed into an intensity spectrogram and a phase spectrogram. In the spectrogram replacement step, the intensity spectrogram is replaced with a target intensity spectrogram generated in advance and the phase spectrogram is constrained. In the third transform step, the replaced intensity spectrogram and the constrained phase spectrogram are transformed into a third waveform function in the temporal domain including a temporal intensity waveform function and a temporal phase waveform function. In the fourth transform step, the third waveform function is transformed into a fourth waveform function in the frequency domain including an intensity spectrum function and a phase spectrum function. In the data generation method, the first transform step, the second transform step, the third transform step, and the fourth transform step are repeatedly performed in this order while replacing the first waveform function in the first transform step with the fourth waveform function in the fourth transform step. In the data generation step, the data is generated based on the phase spectrum function of the fourth waveform function obtained after the repetition.

A form of data generation program is a program for generating data for controlling an SLM. The data generation program causes a computer to execute a first transform step, a second transform step, a spectrogram replacement step, a third transform step, a fourth transform step, and a data generation step. In the first transform step, a first waveform function in a frequency domain including an intensity spectrum function and a phase spectrum function is transformed into a second waveform function in a temporal domain including a temporal intensity waveform function and a temporal phase waveform function. In the second transform step, the second waveform function is transformed into an intensity spectrogram and a phase spectrogram. In the spectrogram replacement step, the intensity spectrogram is replaced with a target intensity spectrogram generated in advance and the phase spectrogram is constrained. In the third transform step, the replaced intensity spectrogram and the constrained phase spectrogram are transformed into a third waveform function in the temporal domain including a temporal intensity waveform function and a temporal phase waveform function. In the fourth transform step, the third waveform function is transformed into a fourth waveform function in the frequency domain including an intensity spectrum function and a phase spectrum function. In the data generation program, the first transform step, the second transform step, the third transform step, and the fourth transform step are repeatedly performed in this order while replacing the first waveform function in the first transform step with the fourth waveform function in the fourth transform step. In the data generation step, the data is generated based on the phase spectrum function of the fourth waveform function obtained after the repetition.

In the data generation device, the data generation method, and the data generation program, repeated calculations are performed between the frequency domain, the temporal domain, and the spectrogram while replacing the intensity spectrogram with the target intensity spectrogram generated in advance and constraining the phase spectrogram. According to the study of the present inventors, this makes it possible to shorten the time required to calculate modulation data for approximating the temporal intensity waveform of beam to a desired waveform, compared with the technique described in Patent Literature 1. In addition, it is possible to improve the calculation accuracy of modulation data.

In the data generation device described above, the first waveform function of the first transform unit at beginning of the repeated operations may be a waveform function related to an initial optical pulse, and the target intensity spectrogram may be an intensity spectrogram related to an optical pulse train including a plurality of optical pulses having time differences therebetween and having different center wavelengths. Similarly, in the data generation method and the data generation program described above, the first waveform function in the first transform step at the beginning of the repetition may be a waveform function related to an initial optical pulse, and the target intensity spectrogram may be an intensity spectrogram related to an optical pulse train including a plurality of optical pulses having time differences therebetween and having different center wavelengths. In these cases, since the center wavelength can be made different for each of the plurality of output pulses, it is possible to apply the optical pulse train to various devices such as a laser processing device, an ultra-high-speed imaging camera, or a terahertz wave generator.

In the data generation device described above, when a full width at half maximum of a wavelength band of beam input to the SLM is $\lambda w$, the target intensity spectrogram may be set such that a full width at half maximum $\lambda s$ of a wavelength band of each of the plurality of optical pulses is larger than $(\lambda w/4)$ and smaller than $(6 \cdot \lambda w/5)$ and a center wavelength interval $\lambda d$ between the plurality of optical pulses is larger than 0 and smaller than $(4 \cdot \lambda w/5)$. Similarly, in the data generation method and the data generation program described above, when a full width at half maximum of a wavelength band of beam input to the SLM is $\lambda w$, the target intensity spectrogram may be set such that a full width at half maximum $\lambda s$ of a wavelength band of each of the plurality of optical pulses is larger than $(\lambda w/4)$ and smaller than $(6 \cdot \lambda w/5)$ and a center wavelength interval $\lambda d$ between the plurality of optical pulses is larger than 0 and smaller than $(4 \cdot \lambda w/5)$. In this case, the temporal waveforms of the plurality of generated optical pulses can be accurately approximated to the target temporal waveform.

A form of light control device includes a light source, a spectral element, an SLM, and an optical system. The light source outputs an input beam. The spectral element splits the input beam. The SLM modulates a spectral phase of the input beam after splitting and outputs modulated beam. The optical system multiplexes wavelength components of the modulated beam. The SLM modulates one or both of the spectral phase or a spectral intensity of the input beam based on the data generated by any of the data generation devices described above. According to the light control device, it is possible to shorten the time required to calculate modulation data for approximating the temporal intensity waveform of output beam to a desired waveform by controlling the SLM based on the data generated by any of the data generation devices described above. In addition, it is possible to improve the calculation accuracy of modulation data.

A form of target intensity spectrogram generation device includes a waveform function setting unit, a fifth transform unit, a sixth transform unit, and a target generator. The waveform function setting unit sets a target waveform function in a frequency domain including an intensity spectrum function and a phase spectrum function for each optical pulse of an optical pulse train including a plurality of optical pulses having time differences therebetween and having different center wavelengths. The fifth transform unit transforms the target waveform function of each of the plurality of optical pulses into a fifth waveform function in a temporal domain including a temporal intensity waveform function and a temporal phase waveform function. The sixth transform unit generates an intensity spectrogram from the fifth waveform function of each of the plurality of optical pulses. The target generator generates a target intensity spectrogram by superimposing the intensity spectrograms of the plurality of optical pulses. The target intensity spectrogram is used to generate data for controlling a spatial light modulator.

A form of target intensity spectrogram generation method includes a waveform function setting step, a fifth transform step, a sixth transform step, and a target generation step. In the waveform function setting step, a target waveform function in a frequency domain including an intensity spectrum function and a phase spectrum function is set for each optical pulse of an optical pulse train including a plurality of optical pulses having time differences therebetween and having different center wavelengths. In the fifth transform step, the target waveform function of each of the plurality of optical pulses is transformed into a fifth waveform function in a temporal domain including a temporal intensity waveform function and a temporal phase waveform function. In the sixth transform step, an intensity spectrogram is generated from the fifth waveform function of each of the plurality of optical pulses. In the target generation step, a target intensity spectrogram is generated by superimposing the intensity spectrograms of the plurality of optical pulses. The target intensity spectrogram is used to generate data for controlling a spatial light modulator.

A form of target intensity spectrogram generation program causes a computer to execute a waveform function setting step, a fifth transform step, a sixth transform step, and a target generation step. In the waveform function setting step, a target waveform function in a frequency domain including an intensity spectrum function and a phase spectrum function is set for each optical pulse of an optical pulse train including a plurality of optical pulses having time differences therebetween and having different center wavelengths. In the fifth transform step, the target waveform function of each of the plurality of optical pulses is transformed into a fifth waveform function in a temporal domain including a temporal intensity waveform function and a temporal phase waveform function. In the sixth transform step, an intensity spectrogram is generated from the fifth waveform function of each of the plurality of optical pulses. In the target generation step, a target intensity spectrogram is generated by superimposing the intensity spectrograms of the plurality of optical pulses. The target intensity spectrogram is used to generate data for controlling a spatial light modulator.

According to the target intensity spectrogram generation device, the target intensity spectrogram generation method, and the target intensity spectrogram generation program, it is possible to appropriately generate a target intensity spectrogram for making the center wavelength different for each of the plurality of pulses.

Advantageous Effects of Invention

According to the data generation device, the light control device, the data generation method, and the data generation program according to the present disclosure, it is possible to shorten the time required to calculate modulation data for approximating the temporal intensity waveform of the optical pulse to the desired waveform. According to the target intensity spectrogram generation device, the target intensity spectrogram generation method, and the target intensity spectrogram generation program according to the present disclosure, it is possible to generate a target intensity spectrogram for making the center wavelength different for each of the plurality of pulses.

DESCRIPTION OF EMBODIMENTS

Figure 1:
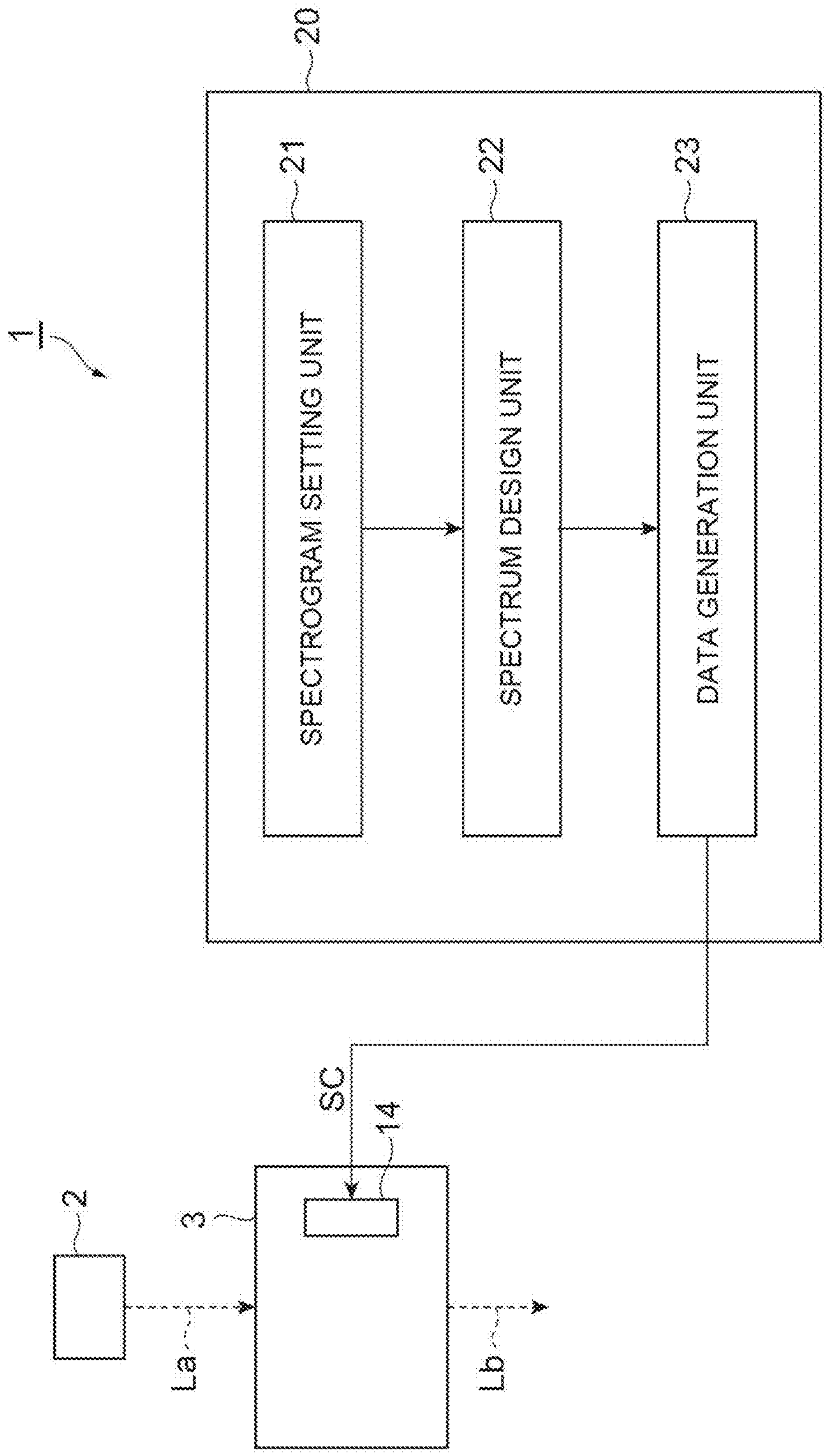
FIG. 1 is a diagram schematically showing the configuration of a light control device according to a first embodiment.

Hereinafter, embodiments will be described in detail with reference to the accompanying diagrams. In the description of the diagrams, the same elements are denoted by the same reference numerals, and the repeated description thereof will be omitted.

FIG. 1 is a diagram schematically showing the configuration of a light control device 1 according to an embodiment of the present disclosure. The light control device 1 according to the present embodiment generates, from an input beam La, an output beam Lb having any temporal intensity waveform different from that of the input beam La. As shown in FIG. 1, the light control device 1 includes a light source 2, an optical waveform control unit 3, and a data generation device 20.

The light source 2 outputs the input beam La that is input to the optical waveform control unit 3. The input beam La is, for example, continuous beam. Alternatively, the light source 2 is, for example, a laser light source such as a solid-state laser light source, and the input beam La (initial optical pulse) is, for example, a single coherent optical pulse. The light source 2 is, for example, a femtosecond laser. In a practical example, the light source 2 is an LD direct excitation type Yb:YAG pulsed laser. The temporal waveform of an optical pulse is, for example, a Gaussian function. The full width at half maximum (FWHM) of the optical pulse is, for example, in the range of 10 fs to 10000 fs. As an example, the full width at half maximum (FWHM) of the optical pulse is 100 fs. The input beam La has a predetermined bandwidth, and includes a plurality of continuous wavelength components. In a practical example, the bandwidth of the input beam La is 10 nm, and the center wavelength of the input beam La is 800 nm.

The optical waveform control unit 3 includes an SLM 14, and receives a control signal SC from the data generation device 20 through the SLM 14. The optical waveform control unit 3 converts the input beam La from the light source 2 into the output beam Lb having any temporal intensity waveform. The control signal SC is generated based on data for controlling the SLM 14, that is, data including the intensity of the complex amplitude distribution or the intensity of the phase distribution. The data is, for example, computer-generated holograms (CGH).

Figure 2:
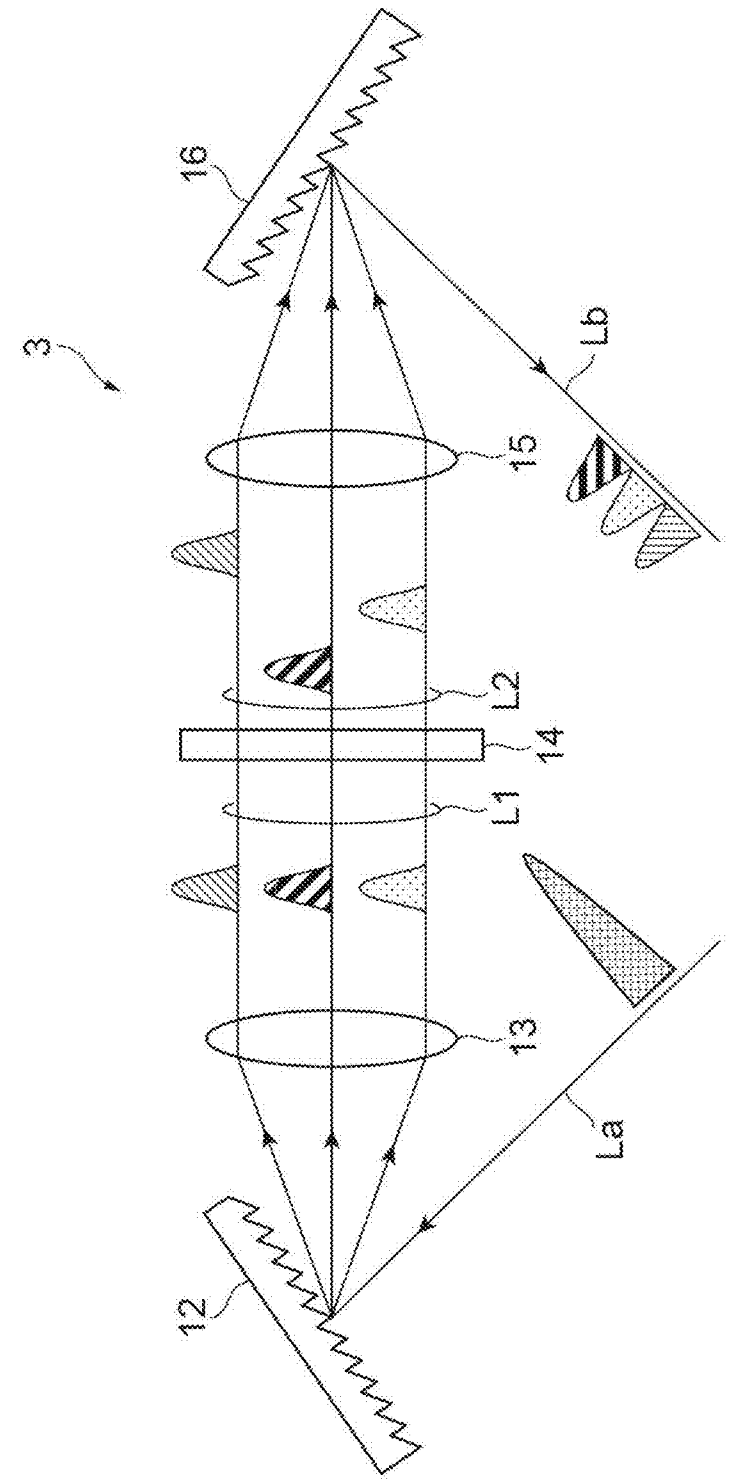
FIG. 2 is a diagram showing the configuration of an optical waveform control unit included in the light control device.

FIG. 2 is a diagram showing a configuration example of the optical waveform control unit 3. The optical waveform control unit 3 includes a diffraction grating 12, a lens 13, a spatial light modulator (SLM) 14, a lens 15, and a diffraction grating 16. The diffraction grating 12 is a spectral element in the present embodiment, and is optically coupled to the light source 2. The SLM 14 is optically coupled to the diffraction grating 12 through the lens 13. The diffraction grating 12 spatially separates a plurality of wavelength components included in the input beam La for each wavelength. As spectral elements, other optical components such as a prism may be used instead of the diffraction grating 12.

The input beam La is obliquely incident on the diffraction grating 12 to be split into a plurality of wavelength components. A beam L1 including the plurality of wavelength components is condensed for each wavelength component by the lens 13, so that the image is formed on the modulation surface of the SLM 14. The lens 13 may be a convex lens formed of a light transmissive member, or may be a concave mirror having a concave light reflecting surface.

The SLM 14 shifts the phases of the plurality of wavelength components output from the diffraction grating 12 from each other, in order to convert the input beam La into the output beam Lb. Therefore, the SLM 14 receives the control signal SC from the data generation device 20 and simultaneously performs phase modulation and intensity modulation of the beam L1. The SLM 14 may perform only the phase modulation or only the intensity modulation. The SLM 14 is of a phase modulation type, for example. In a practical example, the SLM 14 is of an LCOS (Liquid crystal on silicon) type. Although the transmissive SLM 14 is shown in the diagram, the SLM 14 may be of a reflective type. The spatial light modulator 14 is not limited to the phase modulation type spatial light modulator, and may be an intensity modulation type spatial light modulator, such as a DMD (Digital Micro Mirror Device), or a spatial light modulator of a type that modulates both phase and intensity.

Figure 3:
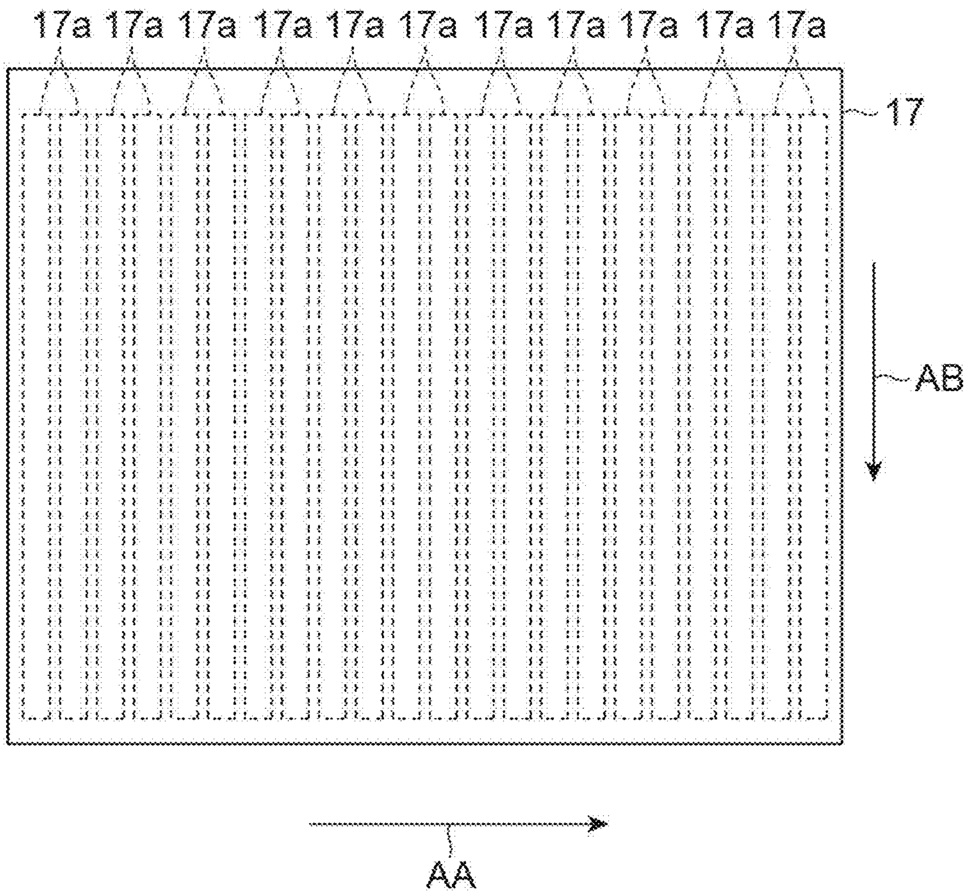
FIG. 3 is a diagram showing the modulation surface of an SLM.

FIG. 3 is a diagram showing a modulation surface 17 of the SLM 14. As shown in FIG. 3, on the modulation surface 17, a plurality of modulation regions 17*a* are aligned along a predetermined direction AA, and each modulation region 17*a* extends in a direction AB crossing the direction AA. The direction AA is a spectral direction by the diffraction grating 12. The modulation surface 17 functions as a Fourier transform surface, and each corresponding wavelength component after splitting is incident on each of the plurality of modulation regions 17*a*. The SLM 14 modulates the phase and intensity of each incident wavelength component independently from other wavelength components in each modulation region 17*a*. Since the SLM 14 of the present embodiment is of a phase modulation type, intensity modulation is realized by the phase pattern, that is, a phase image presented on the modulation surface 17.

Each wavelength component of modulated beam L2 modulated by the SLM 14 is focused at one point on the diffraction grating 16 by the lens 15. The lens 15 and the diffraction grating 16 function as an optical system for condensing the modulated beam L2. The lens 15 may be a convex lens formed of a light transmissive member, or may be a concave mirror having a concave light reflecting surface. The diffraction grating 16 functions as a multiplexing optical system, and multiplexes the modulated wavelength components. That is, a plurality of wavelength components of the modulated beam L2 are condensed and multiplexed by the lens 15 and the diffraction grating 16 to form the output beam Lb. When the SLM 14 is of a reflective type, the lenses 13 and 15 may be formed by using a common lens, and the diffraction gratings 12 and 16 may be formed by using a common diffraction grating.

Figure 4A:
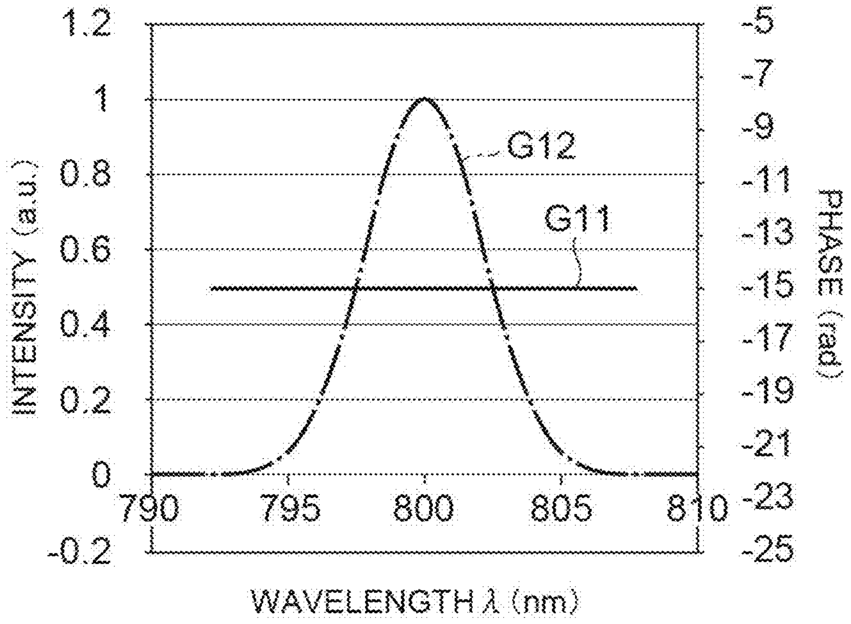
FIG. 4 includes (a) the spectral waveform of single-pulse input beam, and (b) the temporal intensity waveform of single-pulse input beam.
Figure 4B:
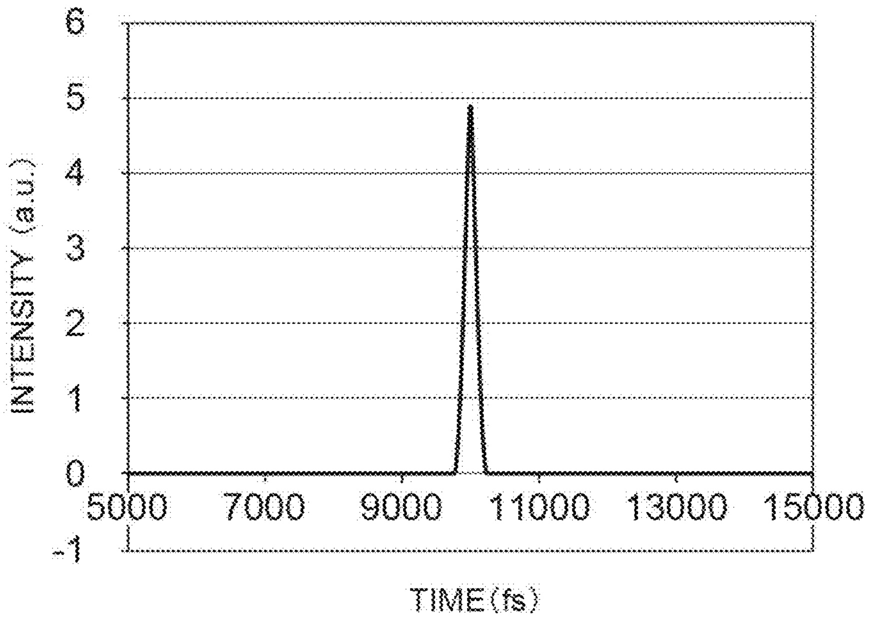
Figure 5A:
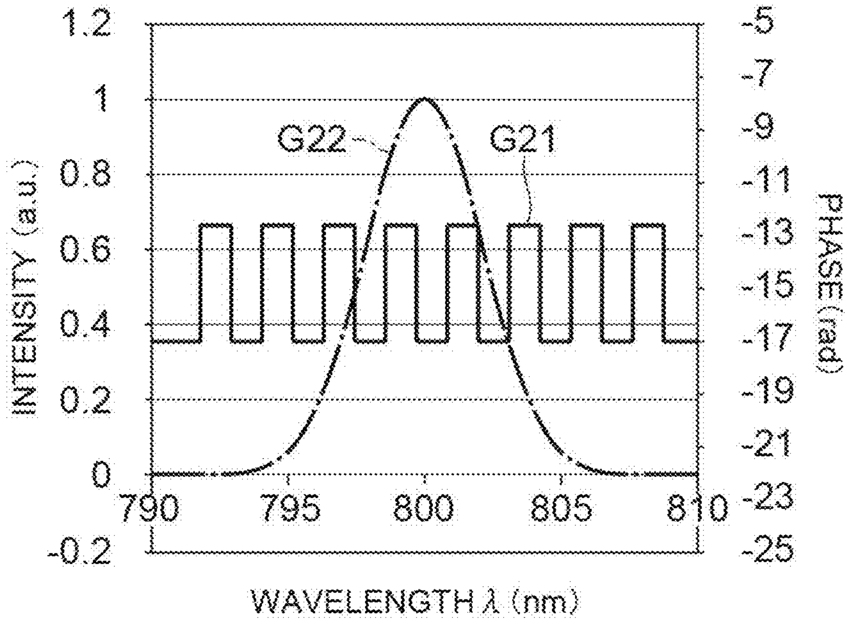
FIG. 5 includes (a) the spectral waveform of output beam when rectangular-wave spectral phase modulation is applied in the SLM, and (b) the temporal intensity waveform of output beam when rectangular-wave spectral phase modulation is applied in the SLM.
Figure 5B:
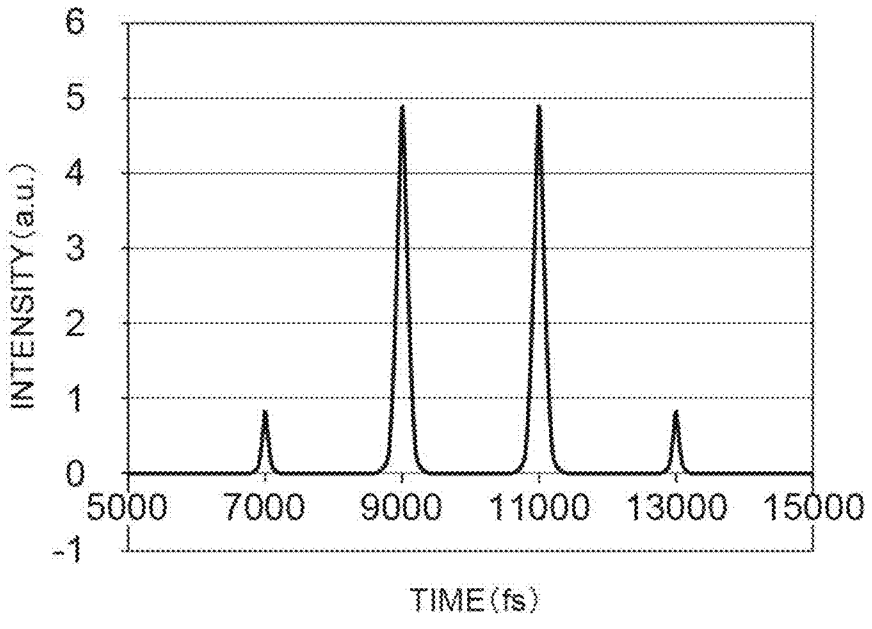

A region in front of the lens 15 (spectral domain) and a region behind the diffraction grating 16 (temporal domain) have a Fourier transform relationship therebetween, and the phase modulation in the spectral domain affects the temporal intensity waveform in the temporal domain. Therefore, the output beam Lb has a desired temporal intensity waveform, which is different from that of the input beam La, according to the modulation pattern of the SLM 14. FIG. 4(*a*) shows, as an example, a spectral waveform (spectral phase G11 and spectral intensity G12) of the single-pulse input beam La. FIG. 4(*b*) shows a temporal intensity waveform of the input beam La. FIG. 5(*a*) shows, as an example, a spectral waveform (spectral phase G21 and spectral intensity g22) of the output beam Lb when the SLM 14 performs rectangular-wave spectral phase modulation. FIG. 5(*b*) shows a temporal intensity waveform of the output beam Lb. In FIGS. 4(*a*) and 5(*a*), the horizontal axis indicates a wavelength (nm), the left vertical axis indicates the intensity value (any unit) of the intensity spectrum, and the right vertical axis indicates the phase value (rad) of the spectral phase. In FIGS. 4(*b*) and 5(*b*), the horizontal axis indicates time (femtoseconds) and the vertical axis indicates light intensity (any unit). In this example, a single pulse of the input beam La is converted into a double pulse with higher-order light as the output beam Lb by applying a rectangular-wave phase spectrum waveform to the output beam Lb. The spectrum and waveform shown in FIG. 5 are one example. By combining various spectral phases and spectral intensities, the temporal intensity waveform of the output beam Lb can be shaped into various shapes.

When the output beam Lb is an optical pulse train including a plurality of optical pulses, the optical pulse train may be a group of single pulses generated by using each wavelength band obtained by dividing the spectrum forming the input beam La into a plurality of wavelength bands. In this case, there may be portions that overlap each other at the boundaries of the plurality of wavelength bands. In the following description, such an optical pulse train may be referred to as "band-controlled multi-pulses".

Figures 6A, 6B, 6C:
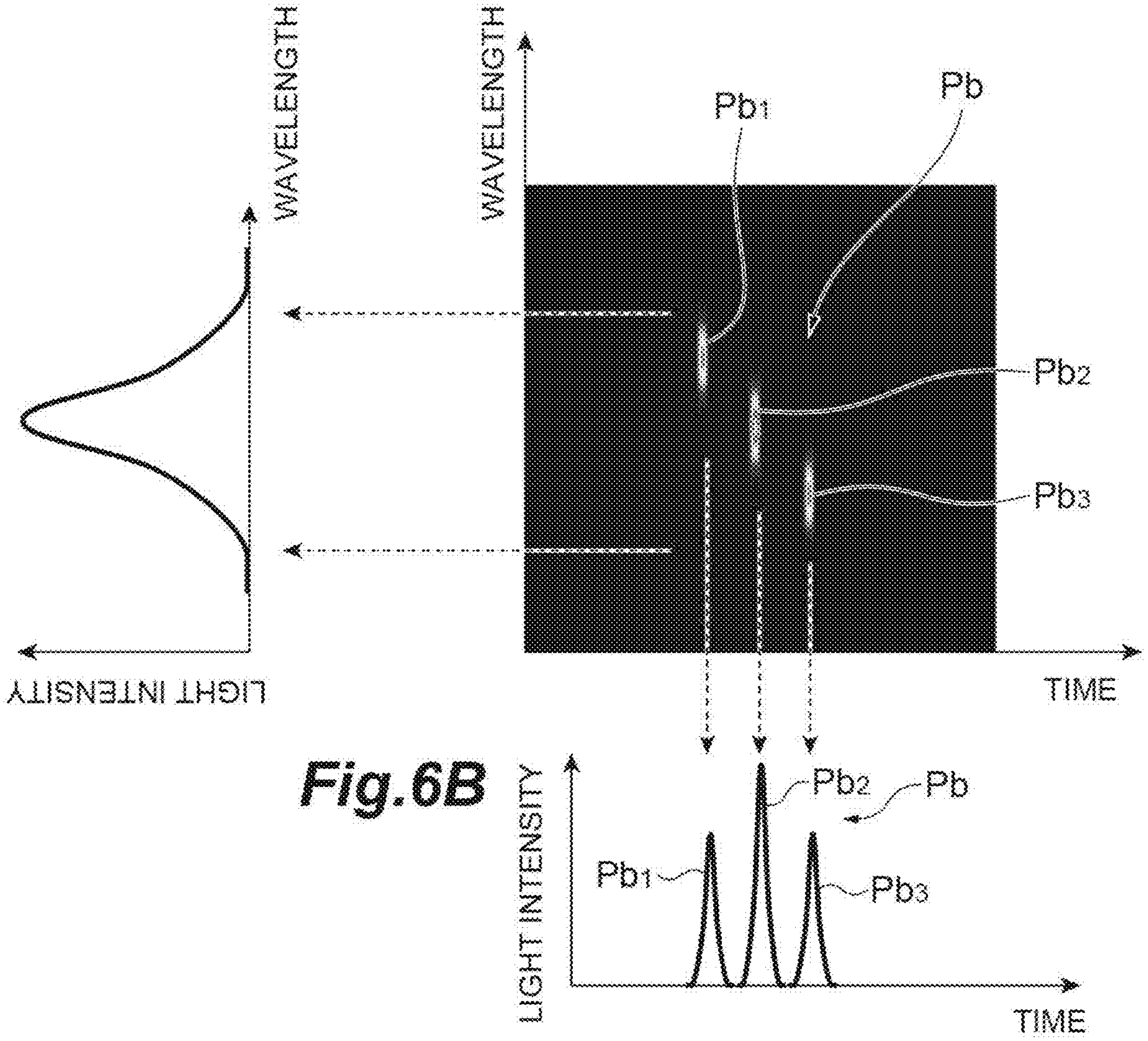
FIG. 6 includes (a) a diagram showing a spectrogram of band-controlled multi-pulses, (b) a diagram showing the temporal waveform of an optical pulse train, and (c) a diagram showing a spectrum obtained by combining three optical pulses.

FIG. 6 is a diagram showing an example of band-controlled multi-pulses. In this example, an optical pulse train Pb including three optical pulses $Pb_1$ to $Pb_3$ is shown. FIG. 6(*a*) is a spectrogram in which the horizontal axis indicates time, the vertical axis indicates wavelength, and the light intensity is expressed by color shading. FIG. 6(*b*) shows a temporal waveform of the optical pulse train Pb. The temporal waveform of each of the optical pulses $Pb_1$ to $Pb_3$ is, for example, a Gaussian function.

As shown in FIGS. 6(*a*) and 6(*b*), the peaks of the three optical pulses $Pb_1$ to $Pb_3$ are temporally separated from each other, and the propagation timings of the three optical pulses $Pb_1$ to $Pb_3$ are shifted from each other. In other words, for one optical pulse $Pb_1$, another optical pulse $Pb_2$ has a time delay, and for another optical pulse $Pb_2$, still another optical pulse $Pb_3$ has a time delay. However, the bottom portions of the adjacent optical pulses $Pb_1$ and $Pb_2$ (or $Pb_2$ and $Pb_3$) may overlap each other. The time interval, that is, the peak interval between the adjacent optical pulses $Pb_1$ and $Pb_2$ (or $Pb_2$ and $Pb_3$) is, for example, in the range of 10 fs to 10000 fs. As an example, the time interval, that is, the peak interval between the adjacent optical pulses $Pb_1$ and $Pb_2$ (or $Pb_2$ and $Pb_3$) is 2000 fs. The FWHM of each of the optical pulses $Pb_1$ to $Pb_3$ is, for example, in the range of 10 fs to 5000 fs. As an example, the FWHM of each of the optical pulses $Pb_1$ to $Pb_3$ is 300 fs.

FIG. 6(*c*) shows a spectrum obtained by combining the three optical pulses $Pb_1$ to $Pb_3$. As shown in FIG. 6(*c*), the spectrum obtained by combining the three optical pulses $Pb_1$ to $Pb_3$ has a single peak. However, referring to FIG. 6(*a*), the center wavelengths of the three optical pulses $Pb_1$ to $Pb_3$ are shifted from each other. The spectrum having a single peak shown in FIG. 6(*c*) is almost the same as the spectrum of the input beam La.

The peak wavelength interval between the adjacent optical pulses $Pb_1$ and $Pb_2$ (or $Pb_2$ and $Pb_3$) is determined by the spectral bandwidth of the input beam La, and is in the range of approximately twice the full width at half maximum. For example, when the spectral bandwidth of the input beam La is 10 nm, the peak wavelength interval is 5 nm. As a specific example, when the center wavelength of the input beam La is 800 nm, the peak wavelengths of the three optical pulses $Pb_1$ to $Pb_3$ can be 795 nm, 800 nm, and 805 nm, respectively.

Figures 7A, 7B, 7C:
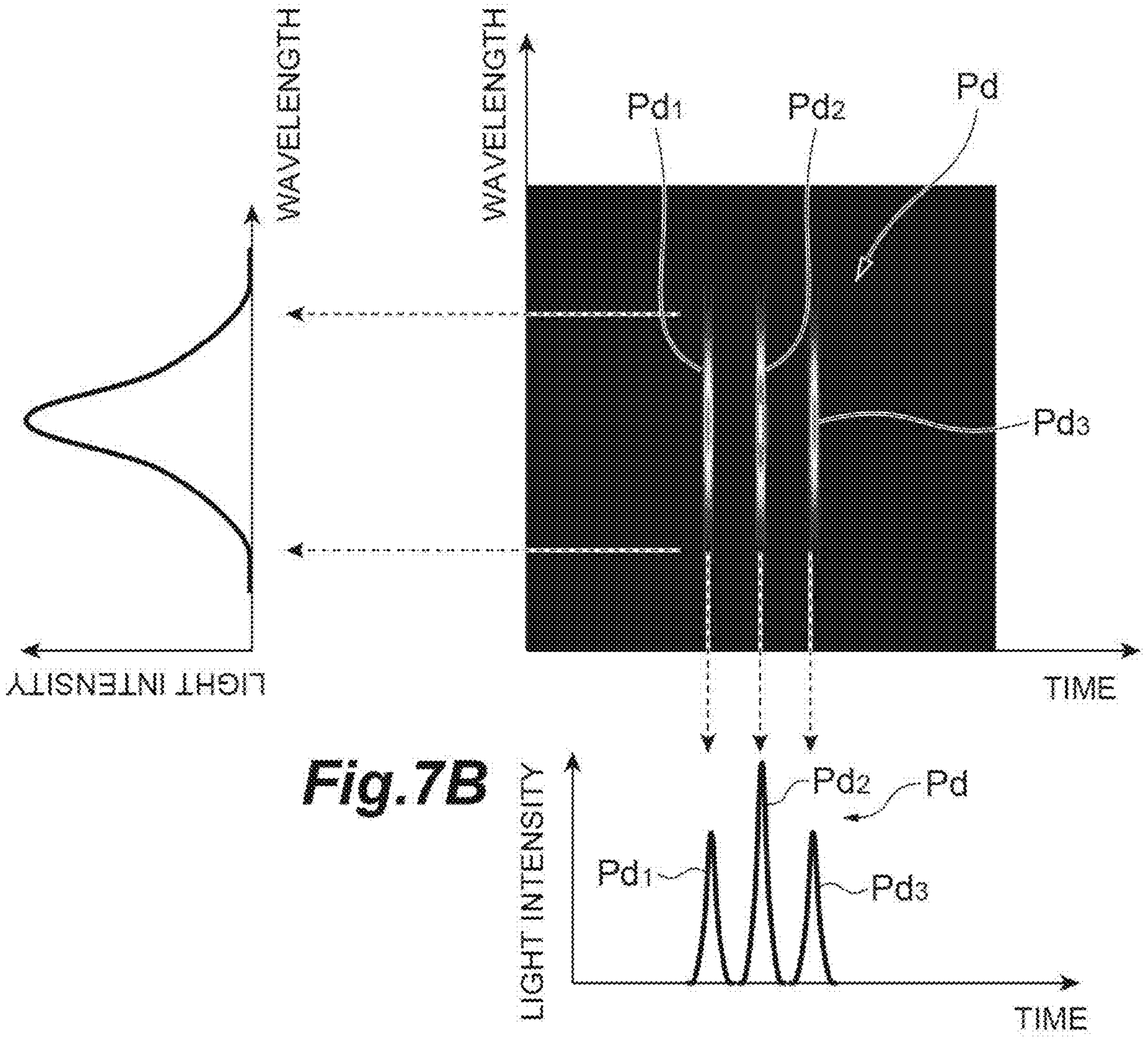
FIG. 7 includes (a) a diagram showing a spectrogram of multi-pulses that are not band-controlled, (b) a diagram showing the temporal waveform of the optical pulse train, and (c) a diagram showing a spectrum obtained by combining three optical pulses.

FIG. 7 is a diagram showing an example of multi-pulses that are not band-controlled. In this example, an optical pulse train Pd including three optical pulses $Pd_1$ to $Pd_3$ is shown. Similarly to FIG. 6(*a*), FIG. 7(*a*) is a spectrogram in which the horizontal axis indicates time, the vertical axis indicates wavelength, and the light intensity is expressed by color shading. FIG. 7(*b*) shows a temporal waveform of the optical pulse train Pd. FIG. 7(*c*) shows a spectrum obtained by combining the three optical pulses $Pd_1$ to $Pd_3$.

As shown in FIGS. 7(*a*) to 7(*c*), the peaks of the three optical pulses $Pd_1$ to $Pd_3$ are temporally separated from each other, but the center wavelengths of the three optical pulses $Pd_1$ to $Pd_3$ match each other. The optical waveform control unit 3 of the present embodiment can generate the optical pulse train Pb shown in FIG. 6, in which the center wavelengths of the optical pulses $Pb_1$ to $Pb_3$ are different, without being limited to the optical pulse train Pd.

FIG. 1 is referred to again. The data generation device 20 is electrically connected to the SLM 14. The data generation device 20 generates data regarding a phase modulation pattern for approximating the temporal intensity waveform of the output beam Lb to a desired waveform, and provides the SLM 14 with the control signal SC including the phase modulation pattern. The data generation device 20 of the present embodiment presents to the SLM 14 a phase pattern for phase modulation for applying a spectral phase and a spectral intensity to obtain a desired waveform to the output beam Lb. For this purpose, the data generation device 20 includes a spectrogram setting unit 21, a spectrum design unit 22, and a data generator 23.

The data generation device 20 may be provided separately from a device that provides the control signal SC to the SLM 14. In this case, the data generation device 20 provides data regarding the phase modulation pattern to the device that provides the control signal SC to the SLM 14. The data generation device 20 may be, for example, a personal computer, a smart device such as a smartphone or a tablet terminal, or a computer having a processor such as a cloud server.

Figure 8:
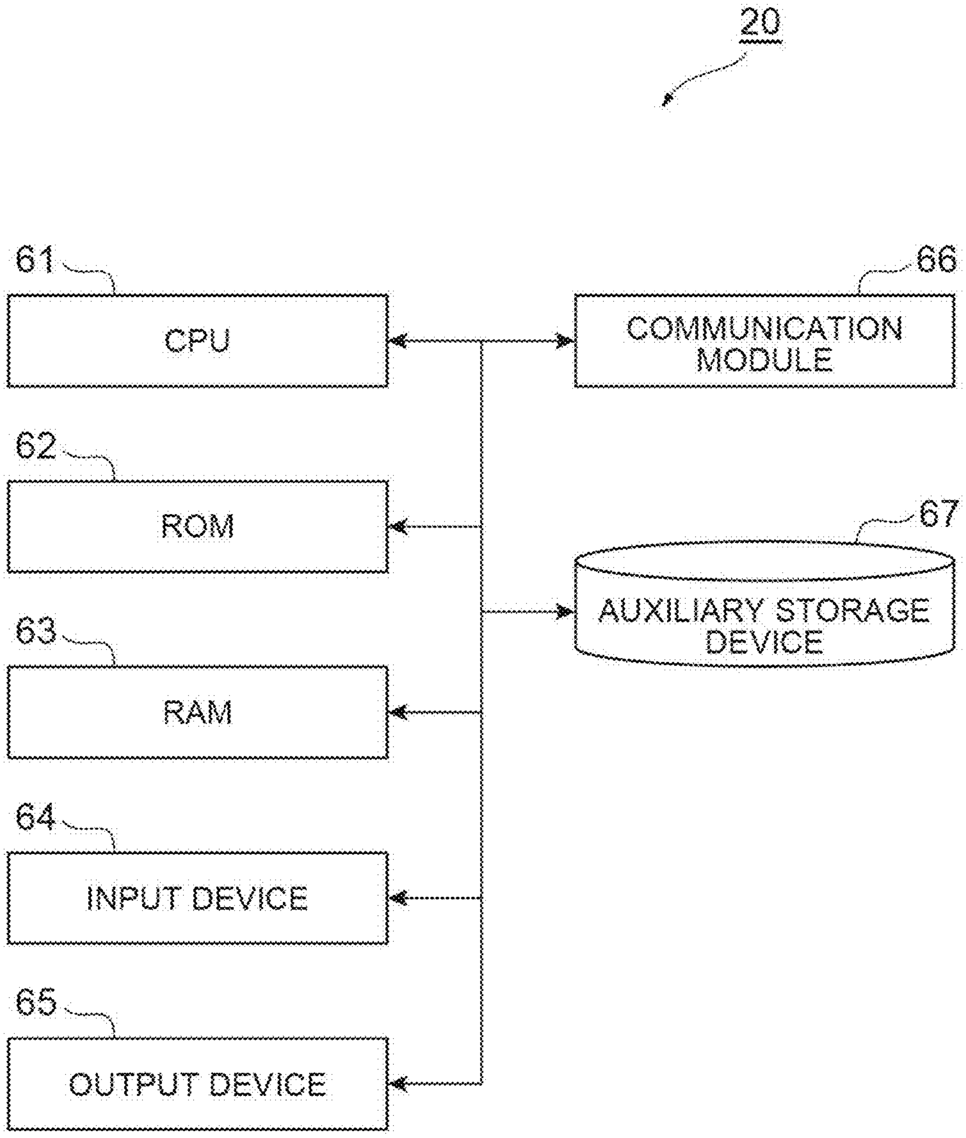
FIG. 8 is a diagram schematically showing an example of the hardware configuration of a data generation device.

FIG. 8 is a diagram schematically showing an example of the hardware configuration of the data generation device 20. As shown in FIG. 8, the data generation device 20 can physically be a normal computer including: a processor (CPU) 61; a main storage device such as a ROM 62 and a RAM 63; an input device 64 such as a keyboard, a mouse, and a touch screen; an output device 65 such as a display (including a touch screen); a communication module 66 such as a network card for transmitting and receiving data to and from other devices; and an auxiliary storage device 67 such as a hard disk.

The processor 61 of the computer can realize each function of the data generation device 20 described above by using a data generation program. Therefore, the data generation program causes the processor 61 of the computer to operate as the spectrogram setting unit 21, the spectrum design unit 22, and the data generator 23 in the data generation device 20. A modulation pattern calculation program is stored in a storage device, in other words, a storage medium, inside or outside the computer. The storage device may be a non-transitory recording medium. Examples of recording media include a recording medium such as a flexible disk, a CD, or a DVD, a recording medium such as a ROM, a semiconductor memory, and a cloud server.

The spectrogram setting unit 21 receives an input of data regarding a desired intensity spectrogram from the operator. In the following description, the desired intensity spectrogram may be referred to as a target intensity spectrogram. The operator inputs data regarding a target intensity spectrogram prepared in advance to the spectrogram setting unit 21. Alternatively, the spectrogram setting unit 21 may hold the target intensity spectrogram in advance, or may be provided with the target intensity spectrogram from a device (described later) that generates the target intensity spectrogram. The data regarding the target intensity spectrogram is provided to the spectrum design unit 22. The spectrum design unit 22 calculates a phase spectrum function suitable for realizing an intensity spectrogram close to the provided target intensity spectrogram.

The data generator 23 calculates a phase modulation pattern to be applied to the output beam Lb in the optical waveform control unit 3 based on the phase spectrum function determined by the spectrum design unit 22. The phase modulation pattern is, for example, a computer-generated hologram. The data generator 23 generates data regarding the phase modulation pattern. Then, the control signal SC including the calculated phase modulation pattern is provided to the SLM 14. The SLM 14 is controlled based on the control signal SC.

Figure 9:
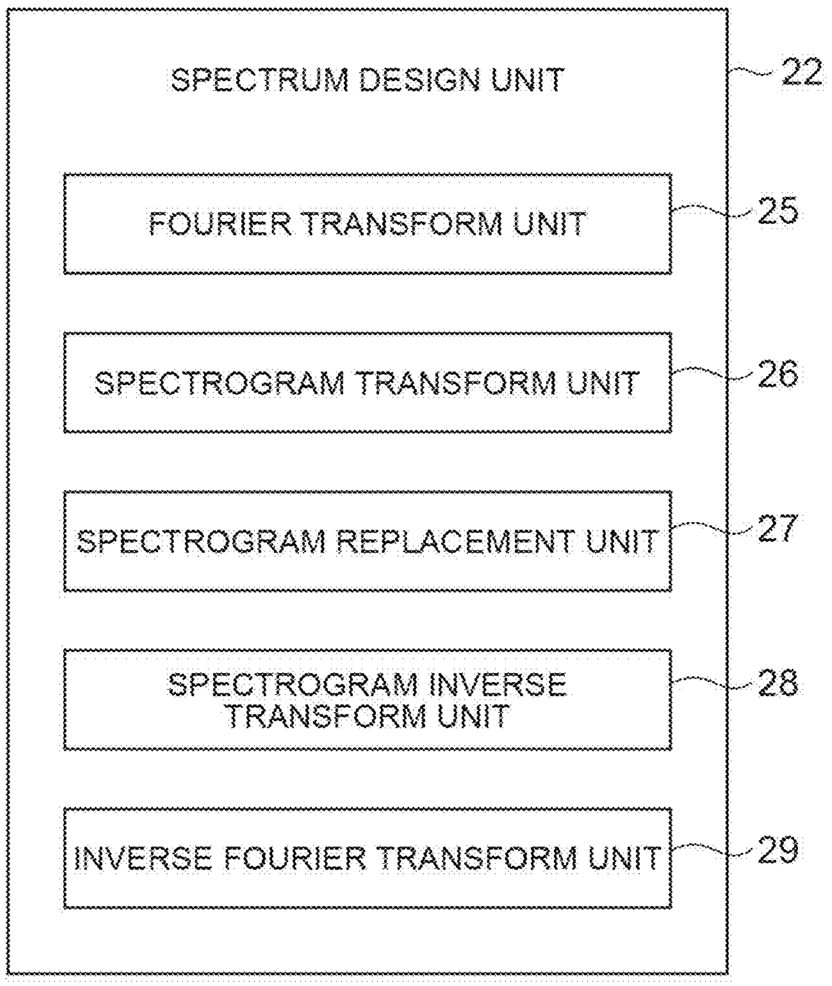
FIG. 9 is a block diagram showing the internal configuration of a spectrum design unit.
Figure 10:
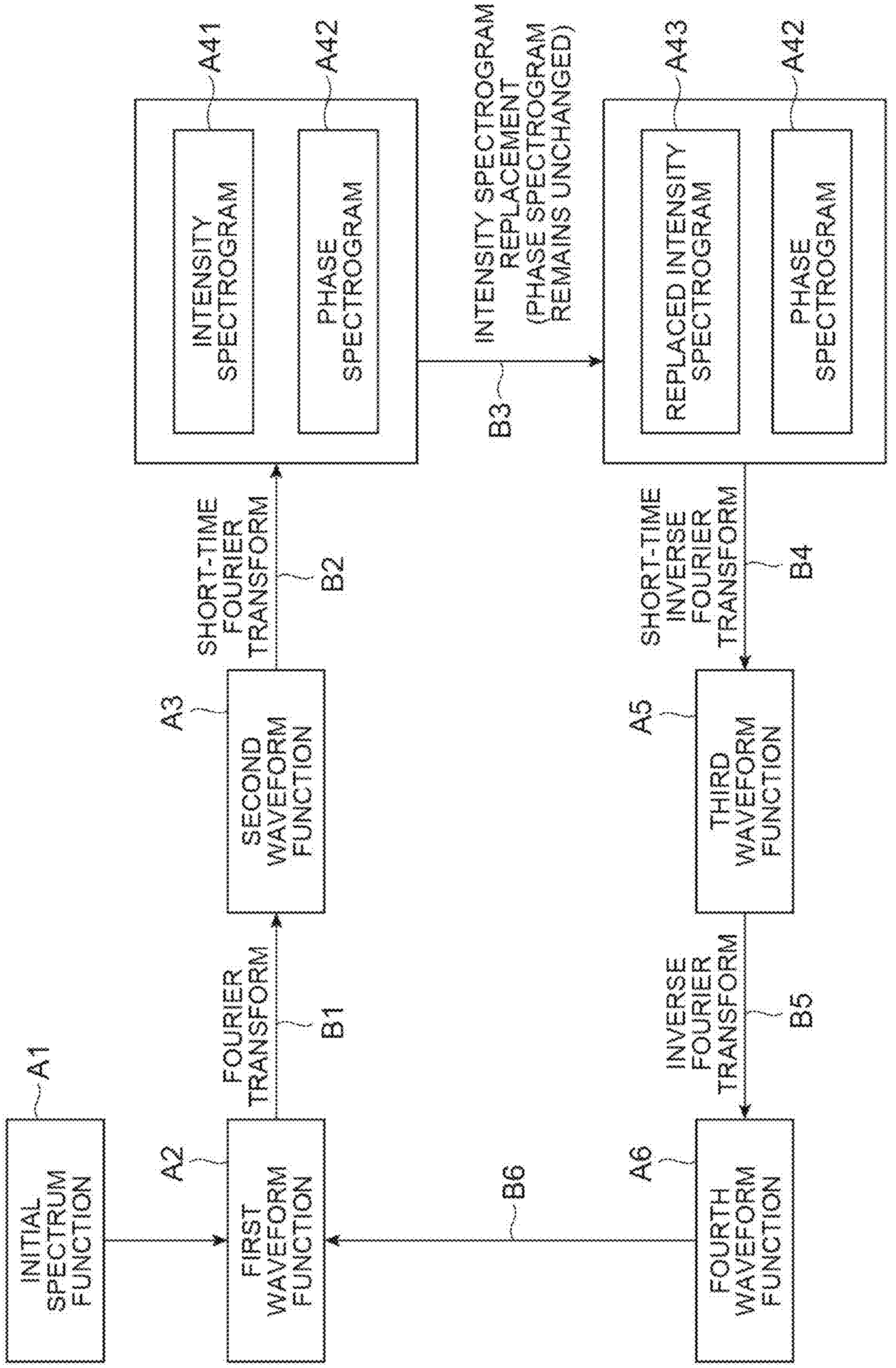
FIG. 10 is a block diagram showing a procedure for calculating a phase spectrum function in the spectrum design unit.
Figure 11:
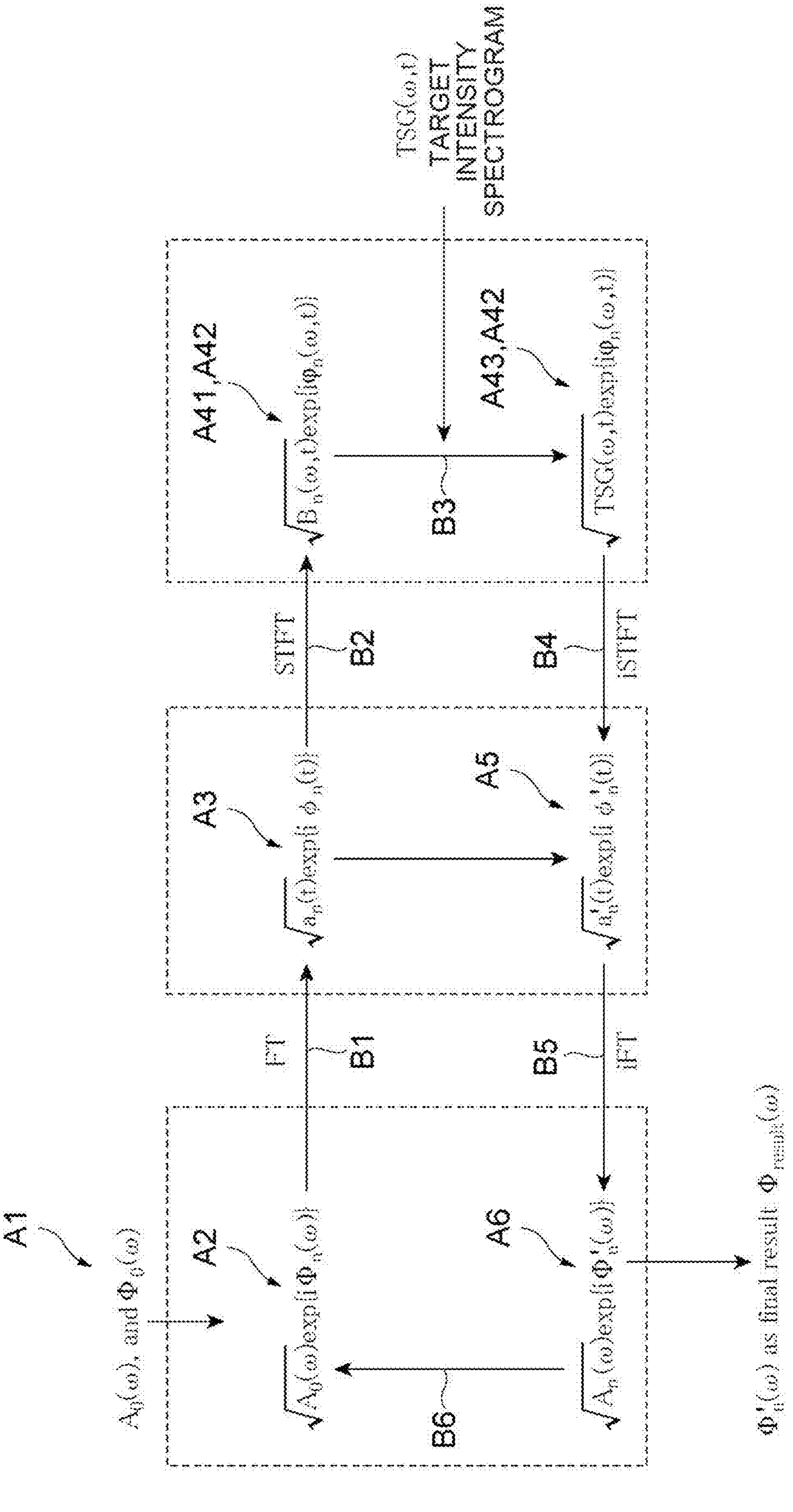
FIG. 11 is a diagram showing a procedure for calculating a phase spectrum function in the spectrum design unit by using mathematical expressions.

FIG. 9 is a block diagram showing the internal configuration of the spectrum design unit 22. As shown in FIG. 9, the spectrum design unit 22 includes a Fourier transform unit (first transform unit) 25, a spectrogram transform unit (second transform unit) 26, a spectrogram replacement unit 27, a spectrogram inverse transform unit (third transform unit) 28, and an inverse Fourier transform unit (fourth transform unit) 29. The spectrum design unit 22 calculates a phase spectrum function, which is the basis of the modulation pattern, by using a calculation method described below. FIG. 10 is a block diagram showing a procedure for calculating the phase spectrum function in the spectrum design unit 22. FIG. 11 is a diagram showing a procedure for calculating the phase spectrum function in the spectrum design unit 22 by using mathematical expressions.

Figure 12A:
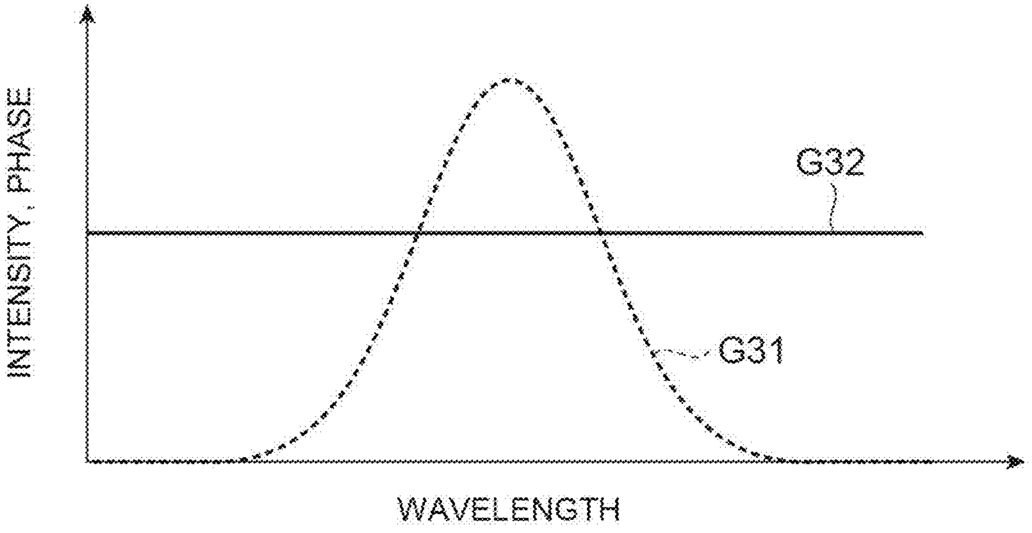
FIG. 12 includes (a) a graph schematically showing an example of an initial spectrum function, and (b) a graph schematically showing a second waveform function in the first cycle, which has been Fourier-transformed from the initial spectrum function shown in (a) of FIG. 12.
Figure 12B:
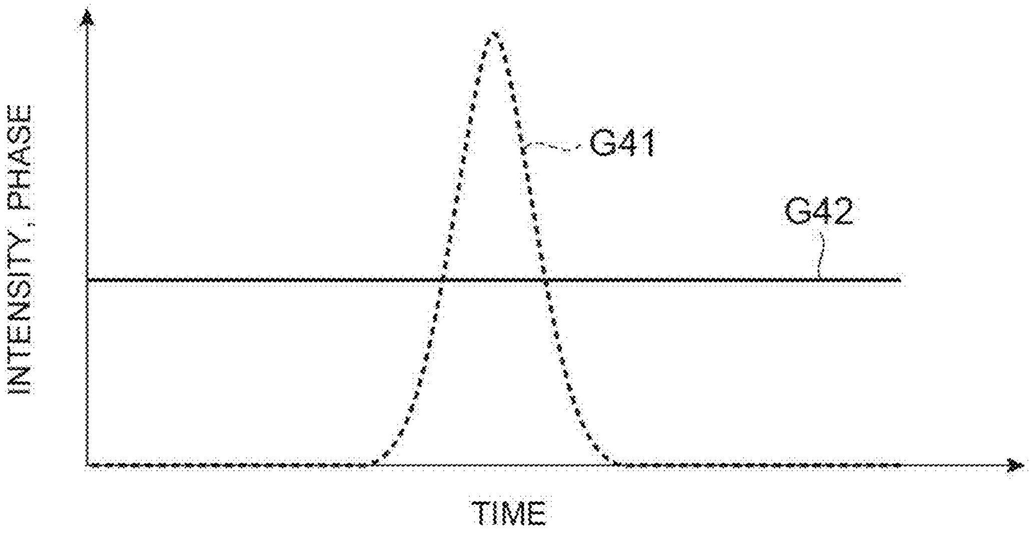
Figure 13A:
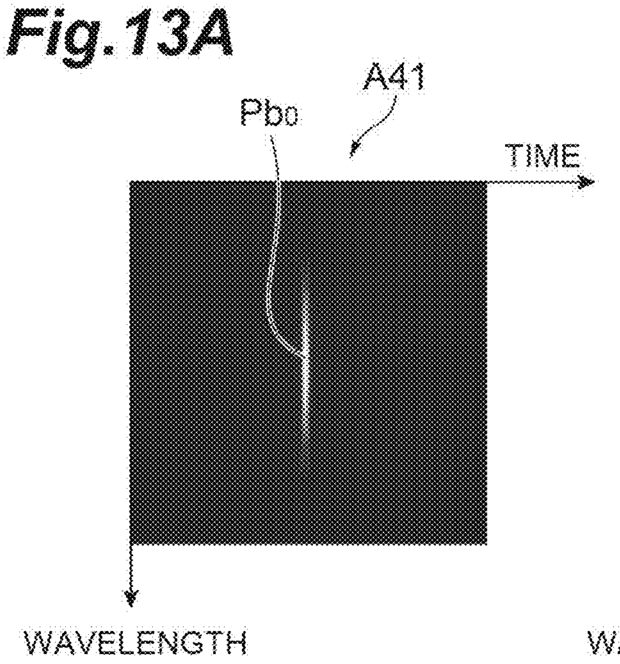
FIG. 13 includes (a) a diagram showing an intensity spectrogram transformed from the second waveform function shown in (b) of FIG. 12, (b) a diagram showing a phase spectrogram transformed from the second waveform function shown in (b) of FIG. 12, (c) a diagram showing an example of a target intensity spectrogram, and (d) a diagram showing a constrained phase spectrogram.
Figure 13B:
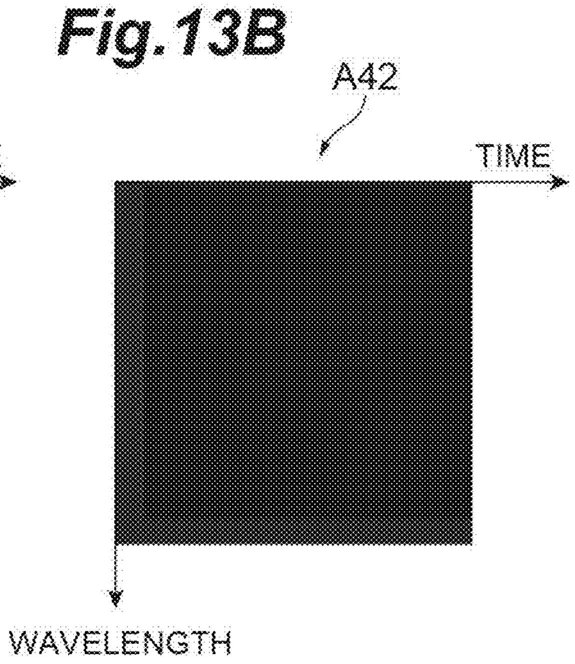
Figure 13C:
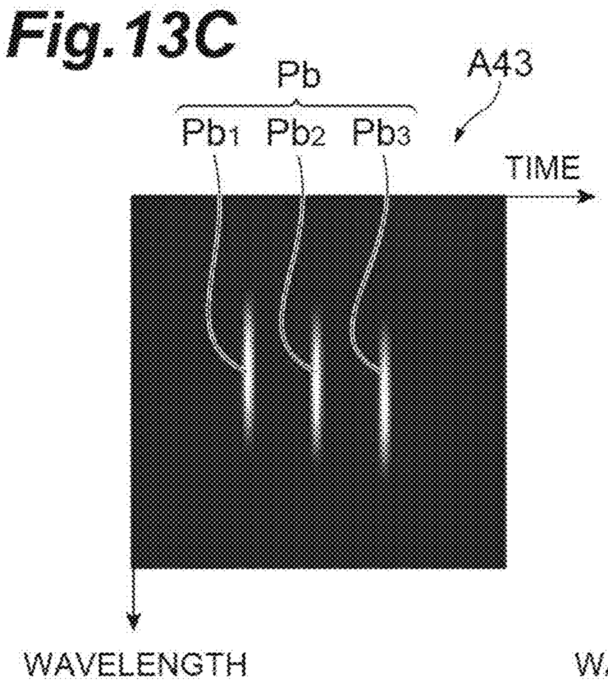
Figure 13D:
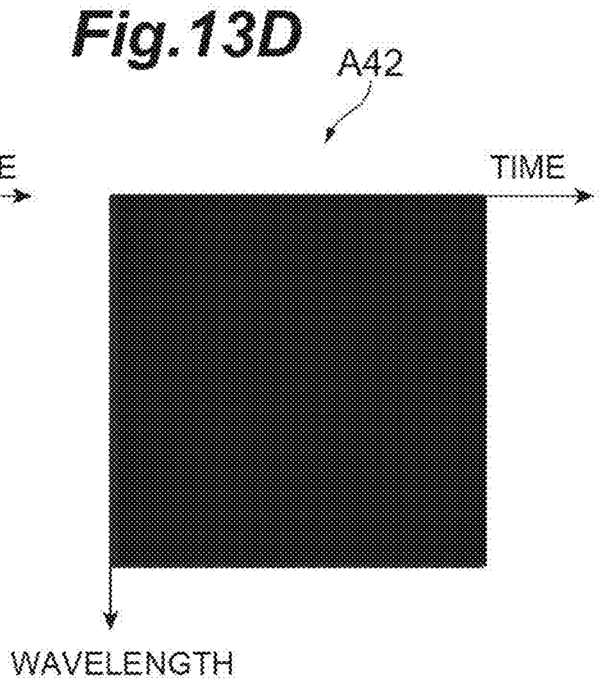

First, an initial spectrum function A1, that is, an initial intensity spectrum function $A_0(\omega)$ and an initial phase spectrum function $\Phi_0(\omega)$, which are functions of the frequency ω, are prepared. For example, the intensity spectrum function $A_0(\omega)$ and the phase spectrum function $\Phi_0(\omega)$ indicate the intensity spectrum and the spectral phase of the input beam La, respectively, but are not limited thereto. FIG. 12(*a*) is a graph schematically showing the intensity spectrum function $A_0(\omega)$ and the phase spectrum function $\Phi_0(\omega)$ as an example of the initial spectrum function A1. In FIG. 12(*a*), a graph G31 shows the intensity spectrum function $A_0(\omega)$, and a graph G32 shows the phase spectrum function $\Phi_0(\omega)$. The horizontal axis indicates wavelength, and the vertical axis indicates the intensity value of the intensity spectrum function or the phase value of the phase spectrum function.

A first waveform function A2 is expressed by the following Expression (1). Here, n is a repetition number (n=1, 2, . . . , N), and i is an imaginary unit. In the first cycle (n=1), the initial spectrum function A1 is set as the first waveform function A2. That is, $\Phi_1(\omega)$ of the first waveform function A2 in the first cycle of repetition is made equal to $\Phi_0(\omega)$.

[Expression 1]

$$\sqrt{A_0(\omega)}\exp\{i\Phi_n(\omega)\} \quad (1)$$

As a first transform step, the Fourier transform unit 25 of the spectrum design unit 22 performs Fourier transform from the frequency domain to the temporal domain on the first waveform function A2 as shown by the arrow B1 in FIGS. 10 and 11. As a result, as shown by the following Expression (2), a second waveform function A3 in the temporal domain including a temporal intensity waveform function $a_n(t)$ and a temporal phase waveform function $\phi_n(t)$ is obtained.

[Expression 2]

$$\sqrt{a_n(t)}\exp\{i\phi_n(t)\} \quad (2)$$

FIG. 12(*b*) is a graph schematically showing the temporal intensity waveform function $a_1(t)$ and the temporal phase waveform function $\phi_1(t)$ of the second waveform function A3 in the first cycle, which has been Fourier-transformed from the first waveform function A2 shown in FIG. 12(*a*). In FIG. 12(*b*), a graph G41 shows the temporal intensity waveform function $a_1(t)$, and a graph G42 shows the temporal phase waveform function $\phi_1(t)$. The horizontal axis indicates time, and the vertical axis indicates the intensity value of the temporal intensity waveform function or the phase value of the temporal phase waveform function.

As a second transform step, the spectrogram transform unit 26 of the spectrum design unit 22 performs short-time Fourier transform on the second waveform function A3 as shown by the arrow B2 in FIGS. 10 and 11 (Short-Time Fourier Transform; STFT). As a result, an intensity spectrogram A41 and a phase spectrogram A42 shown by the following Expression (3) are obtained.

[Expression 3]

$$\sqrt{B_n(\omega, t)}\exp\{i\varphi_n(\omega, t)\} \quad (3)$$

FIGS. 13(*a*) and 13(*b*) are diagrams respectively showing the intensity spectrogram A41 and the phase spectrogram A42 transformed from the second waveform function A3 shown in FIG. 12(*b*). In FIGS. 13(*a*) and 13(*b*), the horizontal axis indicates time and the vertical axis indicates wavelength. The value of the spectrogram is shown by the brightness of the diagram, and the value of the spectrogram increases as the brightness increases. In this example, a single optical pulse $Pb_0$ appears in the intensity spectrogram A41.

The processing in the spectrogram transform unit 26 for transforming the second waveform function A3 into the intensity spectrogram A41 and the phase spectrogram A42 is not limited to the STFT, and may be other kinds of processing. The processing for transforming a temporal waveform into a spectrogram is called time-frequency transform, including the STFT. In the time-frequency transform, frequency filter processing or numerical calculation processing is performed on a composite signal, such as a temporal waveform, to generate three-dimensional information including time, frequency, and signal component intensity, that is, intensity spectrum. The numerical calculation processing referred to herein is processing for deriving the spectrum for each time by performing multiplication while shifting the window function. In the present embodiment, a group including time, frequency, and intensity spectrum that are transform results is defined as a "spectrogram". Examples of time-frequency transform include wavelet transform in addition to the STFT. Examples of wavelet transform include Haar wavelet transform, Gabor wavelet transform, Mexican Hat wavelet transform, and Morlet wavelet transform.

As a spectrogram replacement step, the spectrogram replacement unit 27 of the spectrum design unit 22 replaces the intensity spectrogram A41 with an intensity spectrogram A43, which is a target intensity spectrogram generated in advance, as shown by the arrow B3 in FIGS. 10 and 11. At the same time, the spectrogram replacement unit 27 constrains the phase spectrogram A42. The intensity spectrogram A43 is provided from the spectrogram setting unit 21 (see FIG. 1). Constraining the phase spectrogram A42 means leaving the phase spectrogram A42 unchanged. As a result, the above Expression (3) is replaced with the following Expression (4). TSG(ω, t) is a target intensity spectrogram function.

[Expression 4]

$$\sqrt{TSG(\omega, t)}\exp\{i\varphi_n(\omega, t)\} \quad (4)$$

FIG. 13(*c*) is a diagram showing an example of the intensity spectrogram A43. FIG. 13(*d*) is a diagram showing the constrained phase spectrogram A42. Also in FIGS. 13(*c*) and 13(*d*), the horizontal axis indicates time and the vertical axis indicates wavelength. The value of the spectrogram is shown by the brightness of the diagram, and the value of the spectrogram increases as the brightness increases. In this example, the intensity spectrogram A43 includes the optical pulse train Pb including the three optical pulses $Pb_1$, $Pb_2$, and $Pb_3$ having time differences therebetween and having different center wavelengths. The constrained phase spectrogram A42 is completely the same as the phase spectrogram A42 shown in FIG. 13(*b*).

As a third transform step, the spectrogram inverse transform unit 28 of the spectrum design unit 22 performs inverse STFT on the intensity spectrogram A43 and the phase spectrogram A42, as shown by the arrow B4 in FIGS. 10 and 11. Similarly to the spectrogram transform unit 26, time-frequency transform other than the STFT may also be used herein. As a result, as shown by the following Expression (5), a third waveform function A5 in the temporal domain including a temporal intensity waveform function $a'_n(t)$ and a temporal phase waveform function $\phi'_n(t)$ is obtained. Here, in the first cycle, n=1.

[Expression 5]

$$\sqrt{a'_n(t)}\exp\{i\phi'_n(t)\} \quad (5)$$

Figure 14A:
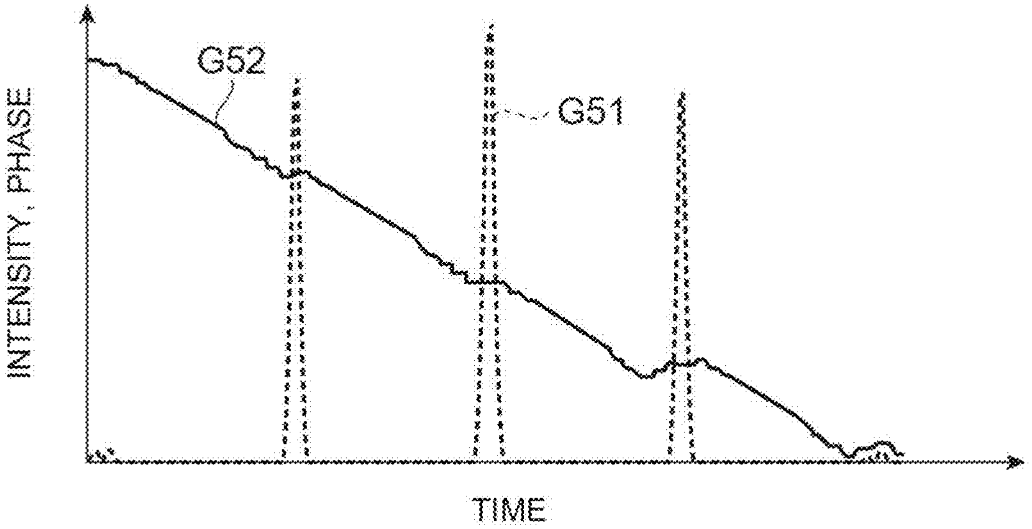
FIG. 14 includes (a) a graph schematically showing a third waveform function in the first cycle, which has been subjected to inverse STFT from the target intensity spectrogram and the phase spectrogram shown in (c) and (d) of FIG. 13, and (b) a graph schematically showing a fourth waveform function in the first cycle, which has been subjected to inverse Fourier transform from the third waveform function shown in (a) of FIG. 14.
Figure 14B:
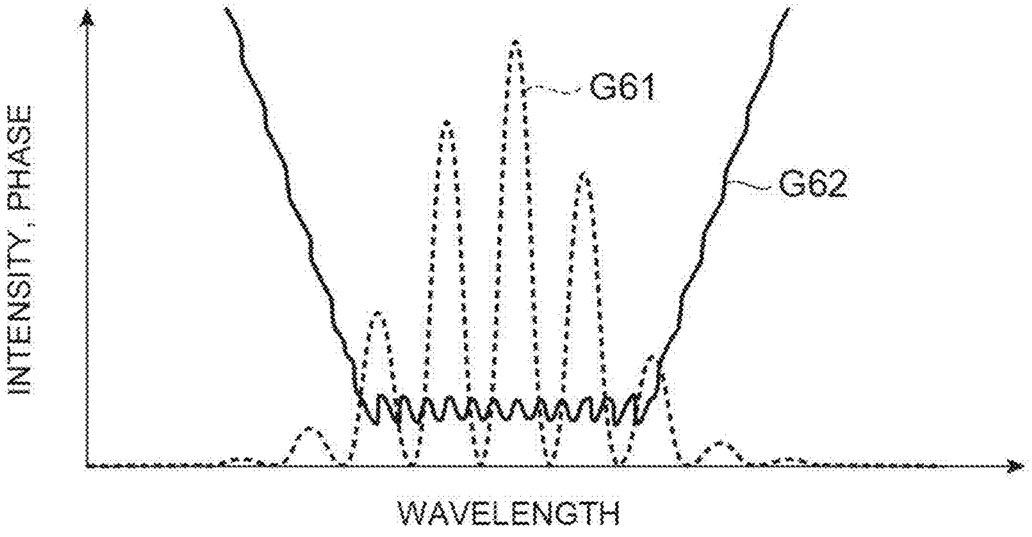

FIG. 14(*a*) is a graph schematically showing the temporal intensity waveform function $a'_1(t)$ and the temporal phase waveform function $\phi'_1(t)$ of the third waveform function A5 in the first cycle, which has been subjected to inverse STFT from the intensity spectrogram A43 shown in FIG. 13(*c*) and the phase spectrogram A42 shown in FIG. 13(*d*). In FIG.

14(*a*), a graph G51 shows the temporal intensity waveform function $a'_1(t)$, and a graph G52 shows the temporal phase waveform function $\phi'_1(t)$. The horizontal axis indicates time, and the vertical axis indicates the intensity value of the temporal intensity waveform function or the phase value of the temporal phase waveform function.

As a fourth transform step, the inverse Fourier transform unit 29 of the spectrum design unit 22 performs an inverse Fourier transform from the temporal domain to the frequency domain on the third waveform function A5, as shown by the arrow B5 in FIGS. 10 and 11. As a result, as shown by the following Expression (6), a fourth waveform function A6 in the frequency domain including an intensity spectrum function $A_n(\omega)$ and a phase spectrum function $\Phi'_n(\omega)$ is obtained. Here, in the first cycle, n=1.

[Expression 6]

$$\sqrt{A_n(\omega)}\exp\{i\Phi'_n(\omega)\} \quad (6)$$

FIG. 14(*b*) is a graph schematically showing the intensity spectrum function $A_1(\omega)$ and the phase spectrum function $\Phi'_1(\omega)$ of the fourth waveform function A6 in the first cycle, which has been subjected to inverse Fourier transform from the third waveform function A5 shown in FIG. 14(*a*). In FIG. 14(*b*), a graph G61 shows the intensity spectrum function $A_1(\omega)$, and a graph G62 shows the phase spectrum function $\Phi'_1(\omega)$. The horizontal axis indicates wavelength, and the vertical axis indicates the intensity value of the intensity spectrum function or the phase value of the phase spectrum function.

Thereafter, as shown by the arrow B6 in the diagrams, the spectrum design unit 22 replaces the phase spectrum function $\Phi_1(\omega)$ of the first waveform function A2 with the phase spectrum function $\Phi'_1(\omega)$ of the fourth waveform function while constraining the intensity spectrum function $A_0(\omega)$ of the first waveform function A2. That is, $\Phi_2(\omega)$ of the first waveform function A2 is made equal to $\Phi'_1(\omega)$. Then, the operations of the Fourier transform unit 25, the spectrogram transform unit 26, the spectrogram replacement unit 27, the spectrogram inverse transform unit 28, and the inverse Fourier transform unit 29 described above are repeated N times until the phase spectrum function converges. Thus, in the spectrum design unit 22, the Fourier transform unit 25, the spectrogram transform unit 26, the spectrogram replacement unit 27, the spectrogram inverse transform unit 28, and the inverse Fourier transform unit 29 repeatedly perform their operations in this order while constraining the intensity spectrum function $A_0(\omega)$ of the first waveform function A2 and replacing the phase spectrum function $\Phi_{n+1}(\omega)$ of the first waveform function A2 in the (n+1)-th cycle with the phase spectrum function $\Phi'_n(\omega)$ of the fourth waveform function in the n-th cycle.

Figure 15A:
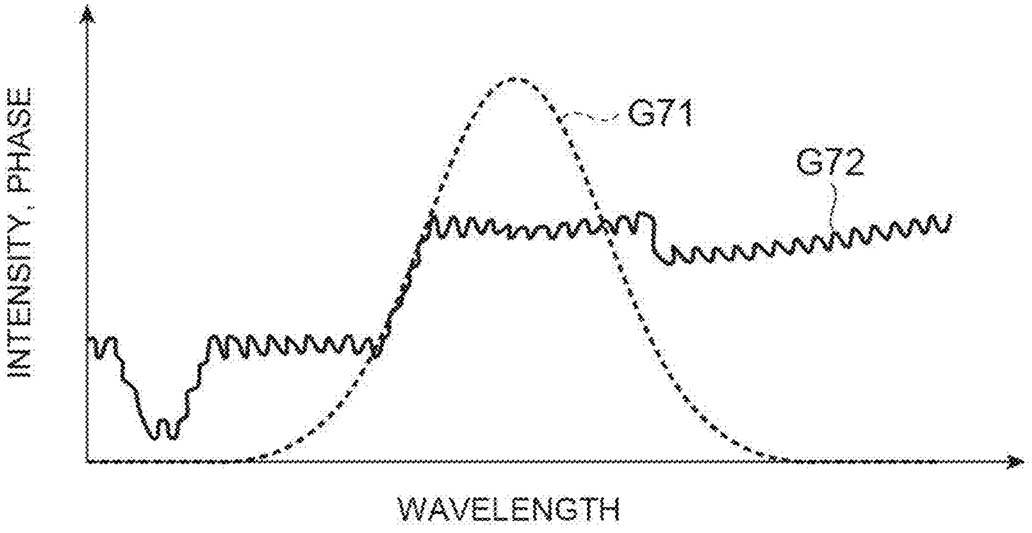
FIG. 15 includes (a) a graph schematically showing a first waveform function in the third cycle after (b) of FIG. 14, and (b) a graph schematically showing a second waveform function in the third cycle, which has been Fourier-transformed from the first waveform function shown in (a) of FIG. 15.
Figure 15B:
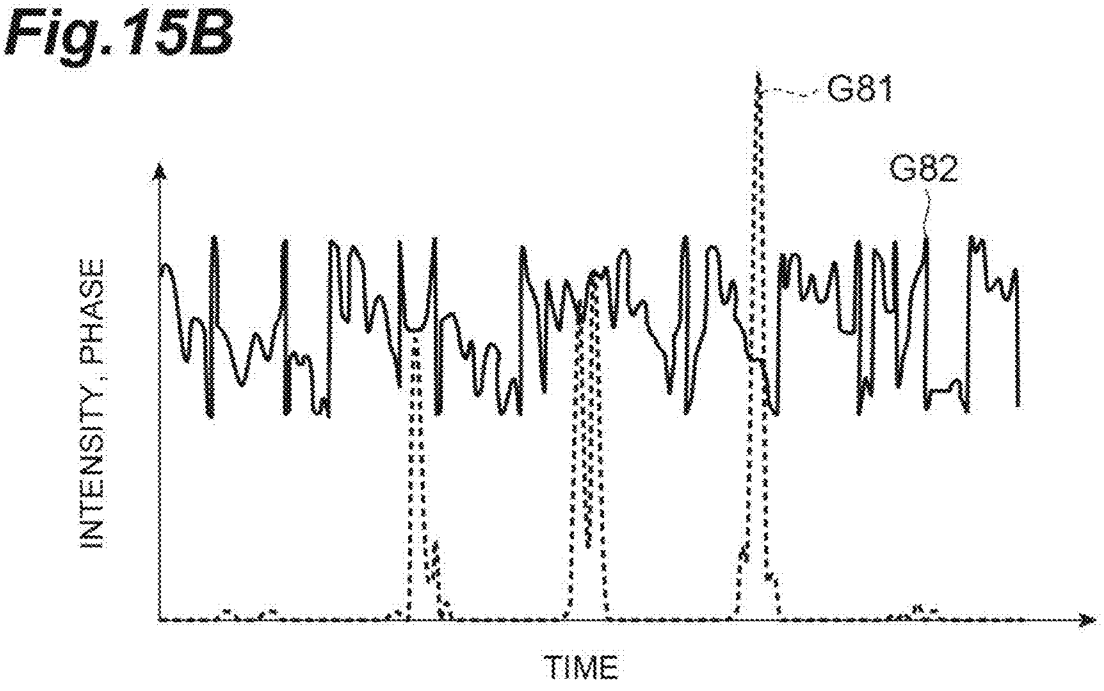
Figure 16A:
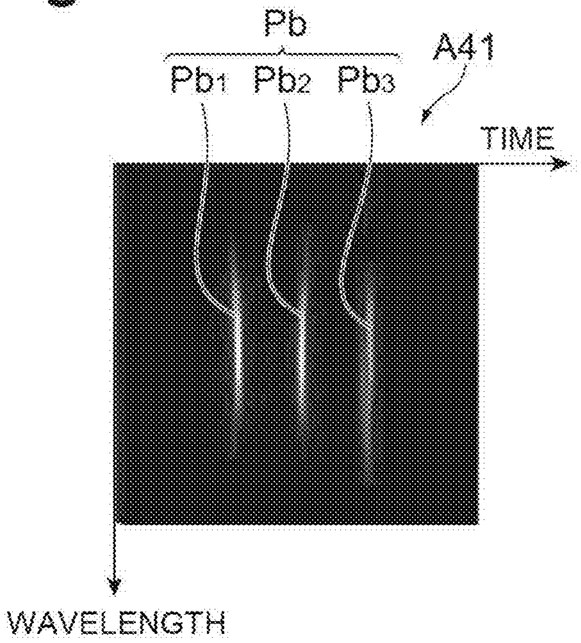
FIG. 16 includes (a) a diagram showing an intensity spectrogram in the third cycle, which has been transformed from the second waveform function shown in (b) of FIG. 15, (b) a diagram showing a phase spectrogram in the third cycle, which has been transformed from the second waveform function shown in (b) of FIG. 15, (c) a diagram showing a target intensity spectrogram in the third cycle, and (d) a diagram showing a constrained phase spectrogram in the third cycle.
Figure 16B:
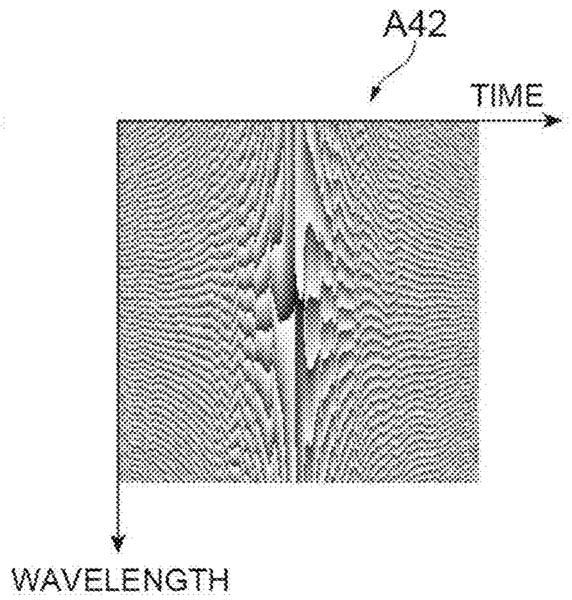
Figure 16C:
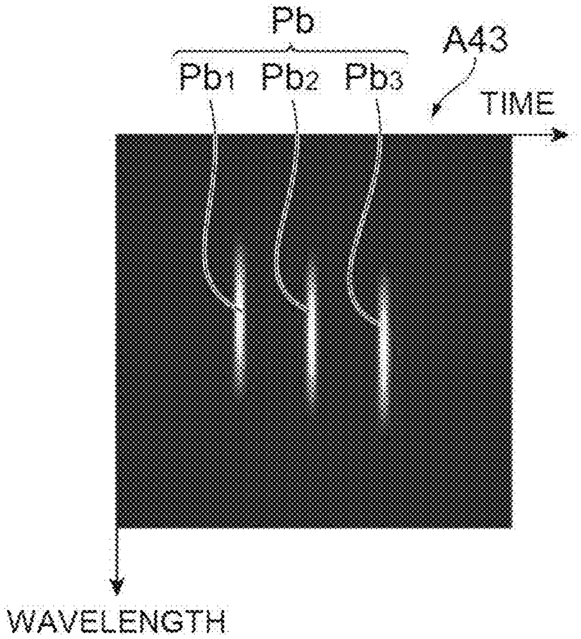
Figure 16D:
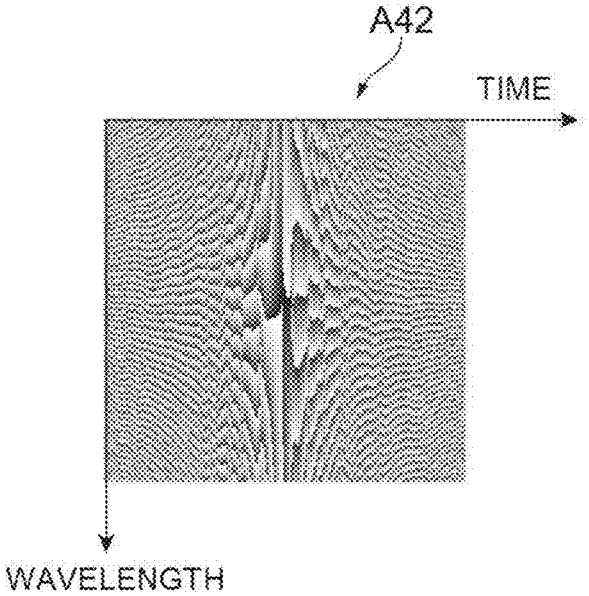
Figure 17A:
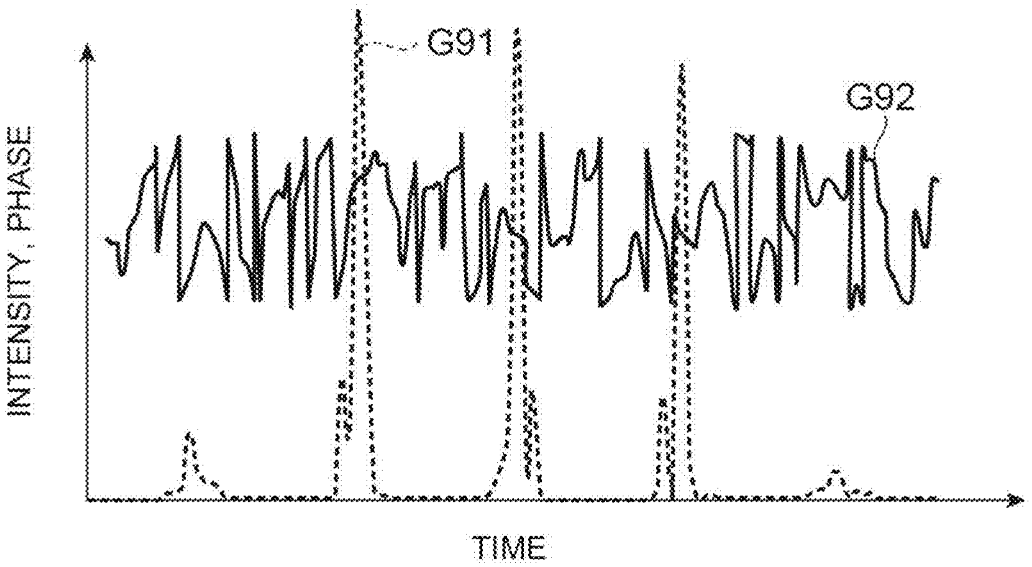
FIG. 17 includes (a) a graph schematically showing a third waveform function in the third cycle, which has been subjected to inverse STFT from the target intensity spectrogram and the phase spectrogram shown in (c) and (d) of FIG. 16, and (b) a graph schematically showing a fourth waveform function in the third cycle, which has been subjected to inverse Fourier transform from the third waveform function shown in (a) of FIG. 17.
Figure 17B:
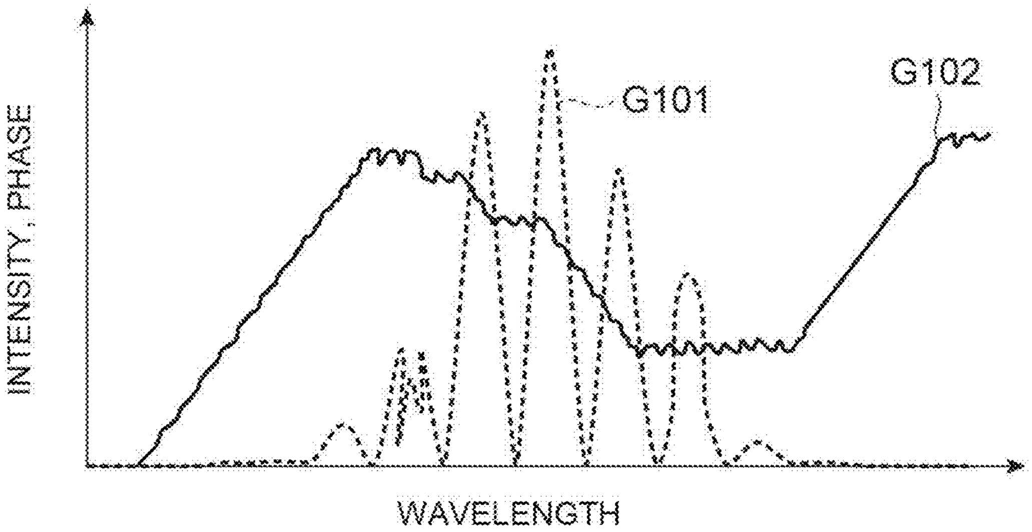

FIG. 15(*a*) is a graph schematically showing the intensity spectrum function $A_0(\omega)$ and the phase spectrum function $\Phi_3(\omega)$ of the first waveform function A2 in the third cycle (n=3) after FIG. 14(*b*). In FIG. 15(*a*), a graph G71 shows the intensity spectrum function $A_0(\omega)$, and a graph G72 shows the phase spectrum function $\Phi_3(\omega)$. Referring to FIG. 15(*a*), it can be seen that the waveform of the phase spectrum function $\Phi_3(\omega)$ has changed from the first cycle. FIG. 15(*b*) is a graph schematically showing the temporal intensity waveform function $a_3(t)$ and the temporal phase waveform function $\Phi_3(t)$ of the second waveform function A3 in the third cycle, which has been Fourier-transformed from the first waveform function A2 shown in FIG. 15(*a*). In FIG. 15(*b*), a graph G81 shows the temporal intensity waveform function $a_3(t)$, and a graph G82 shows the temporal phase waveform function $\Phi_3(t)$. FIGS. 16(*a*) and 16(*b*) are diagrams respectively showing the intensity spectrogram A41 and the phase spectrogram A42 in the third cycle transformed from the second waveform function A3 shown in FIG. 15(*b*). It can be seen that the three optical pulses $Pb_1$ to $Pb_3$ having time differences therebetween and having different center wavelengths start to be generated. FIG. 16(*c*) is a diagram showing the intensity spectrogram A43 in the third cycle, which is the same as the intensity spectrogram A43 in the first cycle shown in FIG. 13(*c*). FIG. 16(*d*) is a diagram showing the constrained phase spectrogram A42 in the third cycle, which is the same as the phase spectrogram A42 in FIG. 16(*b*). FIG. 17(*a*) is a graph schematically showing the temporal intensity waveform function $a'_3(t)$ and the temporal phase waveform function $\phi'_3(t)$ of the third waveform function A5 in the third cycle, which has been subjected to inverse STFT from the intensity spectrogram A43 and the phase spectrogram A42 shown in FIGS. 16(*c*) and 16(*d*). In FIG. 17(*a*), a graph G91 shows the temporal intensity waveform function $a'_3(t)$, and a graph G92 shows the temporal phase waveform function $\phi'_3(t)$. FIG. 17(*b*) is a graph schematically showing the intensity spectrum function $A_3(\omega)$ and the phase spectrum function $\Phi'_3(\omega)$ of the fourth waveform function A6 in the third cycle, which has been subjected to inverse Fourier transform from the third waveform function A5 shown in FIG. 17(*a*). In FIG. 17(*b*), a graph G101 shows the intensity spectrum function $A_3(\omega)$, and a graph G102 shows the phase spectrum function $\Phi'_3(\omega)$.

By the repeated operations described above, the phase spectrum function $\Phi'_n(\omega)$ is modified so that the intensity spectrogram A41 gradually approaches the intensity spectrogram A43. Finally, the phase spectrum function $\Phi'_N(\omega)$ included in the fourth waveform function A6 becomes a desired spectral phase solution $\Phi_{result}(\omega)$. This spectral phase solution $\Phi_{result}(\omega)$ is provided to the data generator 23.

In the data generation step, the data generator 23 calculates data regarding a phase modulation pattern for applying to the output beam Lb the spectral phase and/or spectral intensity based on the spectral phase solution $\Phi_{result}(\omega)$ calculated by the spectrum design unit 22, for example, data regarding a computer-generated hologram.

The effects obtained by the data generation device 20, the data generation method, and the data generation program of the present embodiment described above will be described. In the present embodiment, repeated calculations are performed between the frequency domain, the temporal domain, and the spectrogram while replacing the intensity spectrogram A41 with the intensity spectrogram A43, which is a target intensity spectrogram generated in advance, and constraining the phase spectrogram A42. According to the study of the present inventors, this makes it possible to shorten the time required to calculate the spectral phase solution $\Phi_{result}(\omega)$ for approximating the temporal intensity waveform of the output beam Lb to a desired waveform, compared with the technique described in Patent Literature 1. In addition, it is possible to improve the calculation accuracy of the spectral phase solution $\Phi_{result}(\omega)$.

Figure 18A:
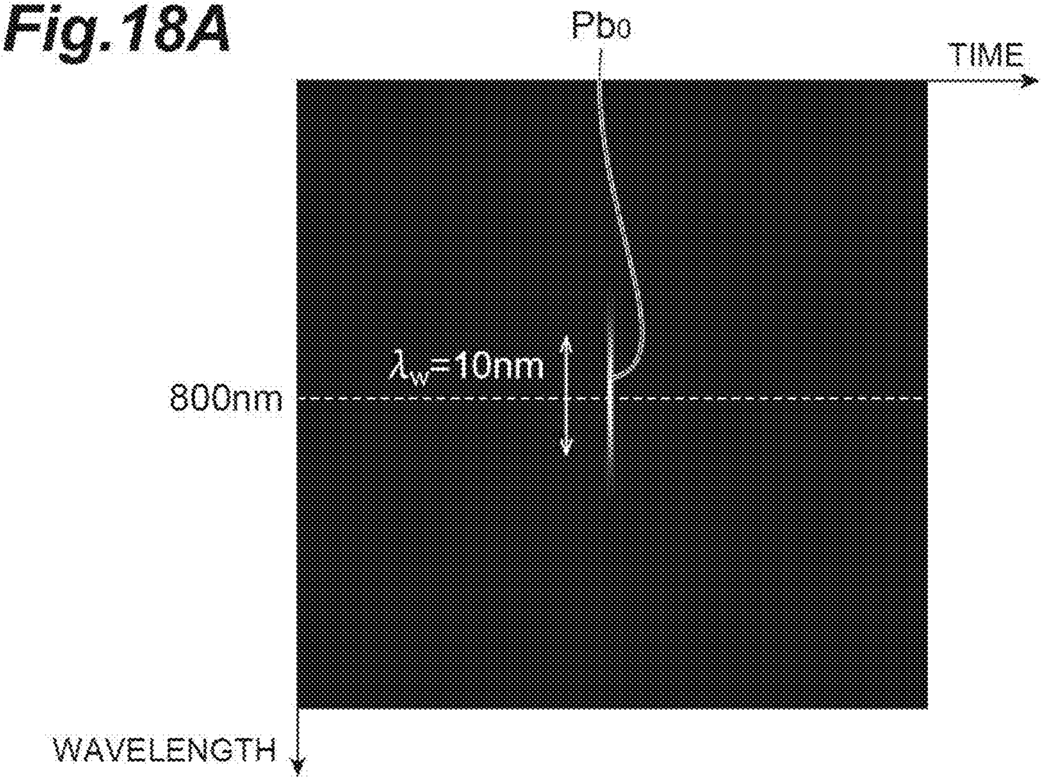
FIG. 18 includes (a) a spectrogram showing an initial spectrum function used in a practical example, and (b) a diagram showing a target intensity spectrogram used in the practical example.
Figure 18B:
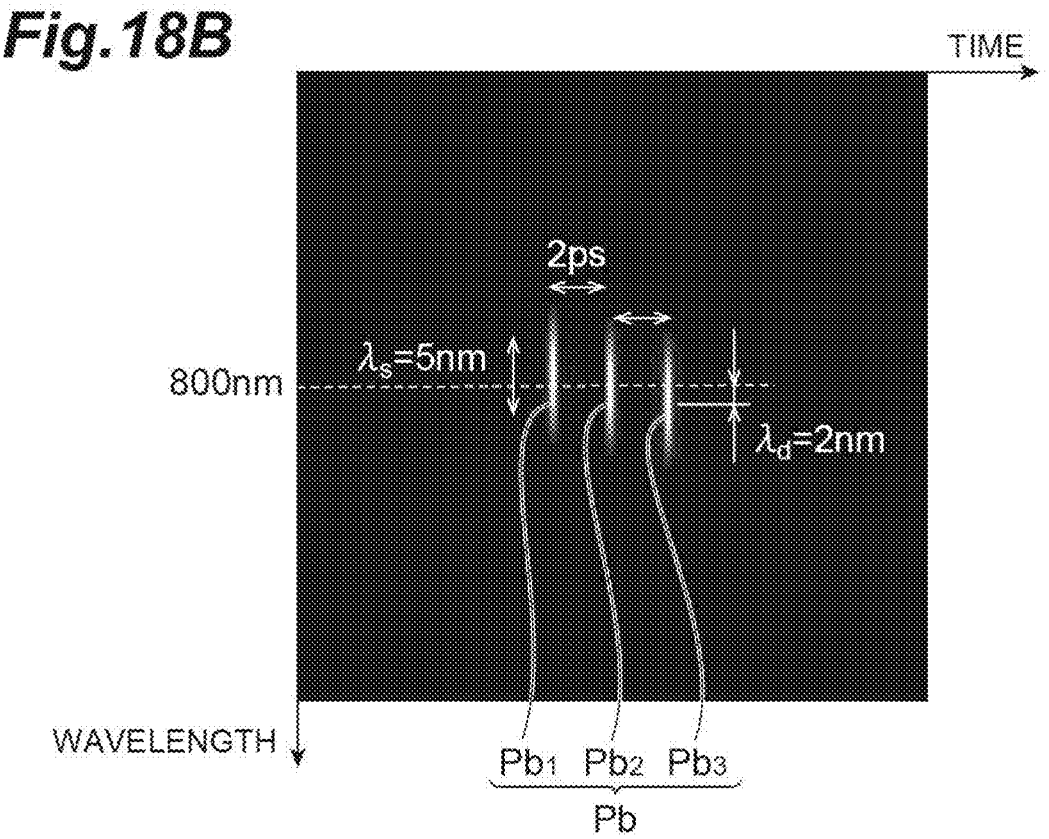

Here, a practical example will be described. The present inventors calculated data regarding phase modulation patterns by using the data generation device 20 of the present embodiment and the data generation device described in Patent Literature 1. These phase modulation patterns are phase modulation patterns for generating the optical pulse train Pb, which includes the three optical pulses $Pb_1$ to $Pb_3$ having time differences therebetween and having different center wavelengths, from the input beam La that is a single optical pulse whose temporal waveform has a Gaussian shape. FIG. 18(*a*) is a spectrogram showing the initial spectrum function A1 used in this practical example. This spectrogram includes a single optical pulse $Pb_0$. The center wavelength of the optical pulse $Pb_0$ is 800 nm, and the wavelength band (full width at half maximum) λw of the optical pulse $Pb_0$ is 10 nm. FIG. 18(*b*) is a diagram showing the intensity spectrogram A43 (target intensity spectrogram) used in this practical example. This intensity spectrogram A43 includes three optical pulses $Pb_1$ to $Pb_3$. The full width at half maximum λs of the wavelength band of each optical pulse is 5 nm. The time interval between adjacent optical pulses is 2 ps. The center wavelength interval λd between adjacent optical pulses is 2 nm.

Figure 19:
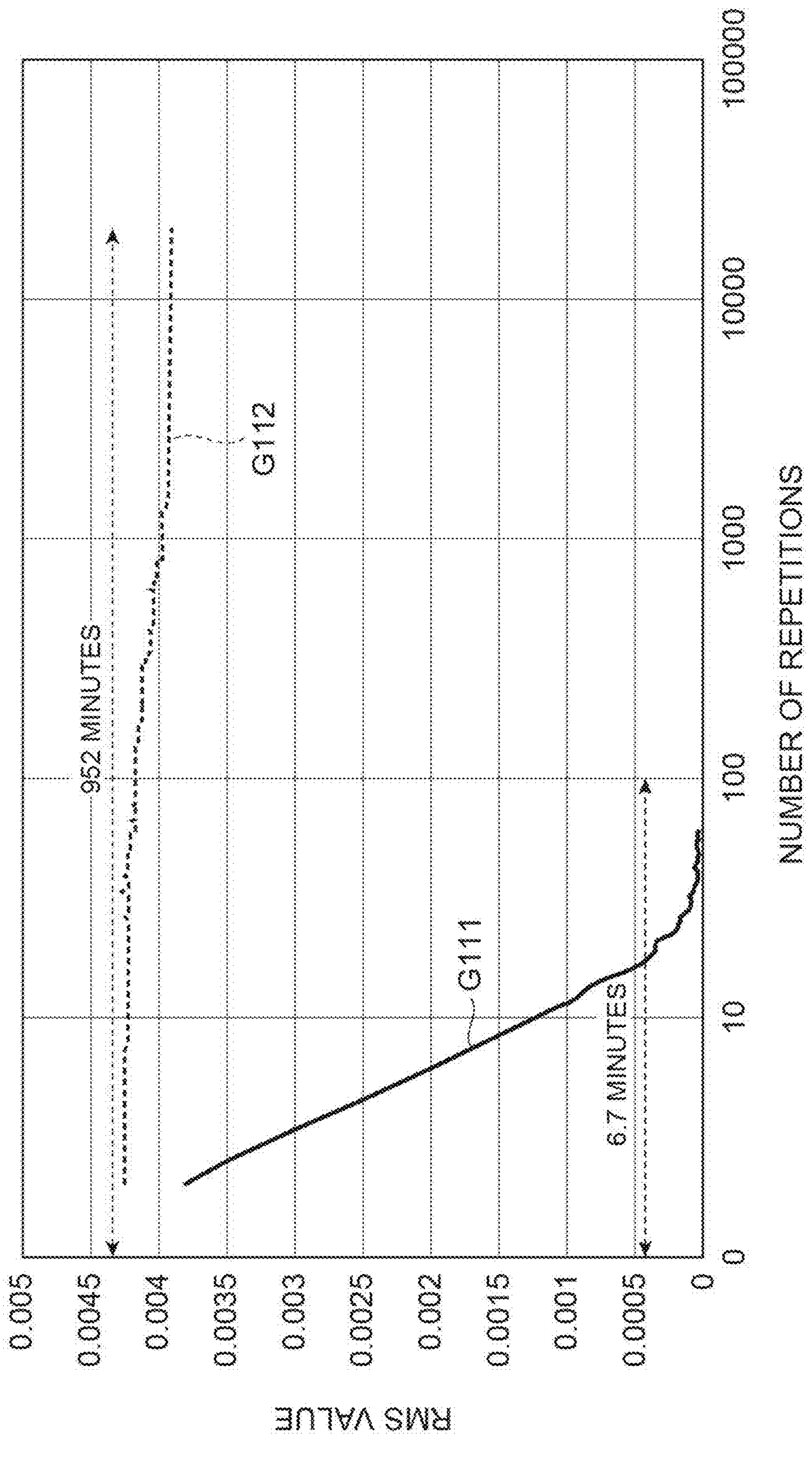
FIG. 19 is a graph showing the relationship between the number of repetitions until calculation results converge and the calculation accuracy for a design value, which is obtained by the practical example.
Figure 20A:
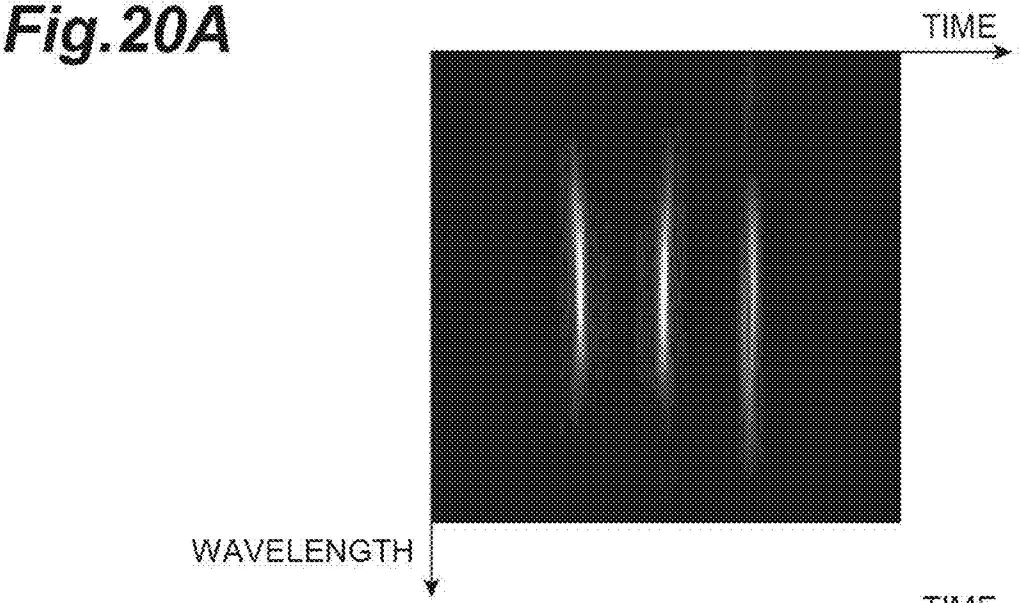
FIG. 20 includes (a) an intensity spectrogram in the first cycle of repeated calculations in the data generation device of the embodiment, (b) an intensity spectrogram when calculation results converge in the data generation device of the embodiment, and (c) an intensity spectrogram when calculation results converge in a data generation device described in Patent Literature 1.
Figure 20B:
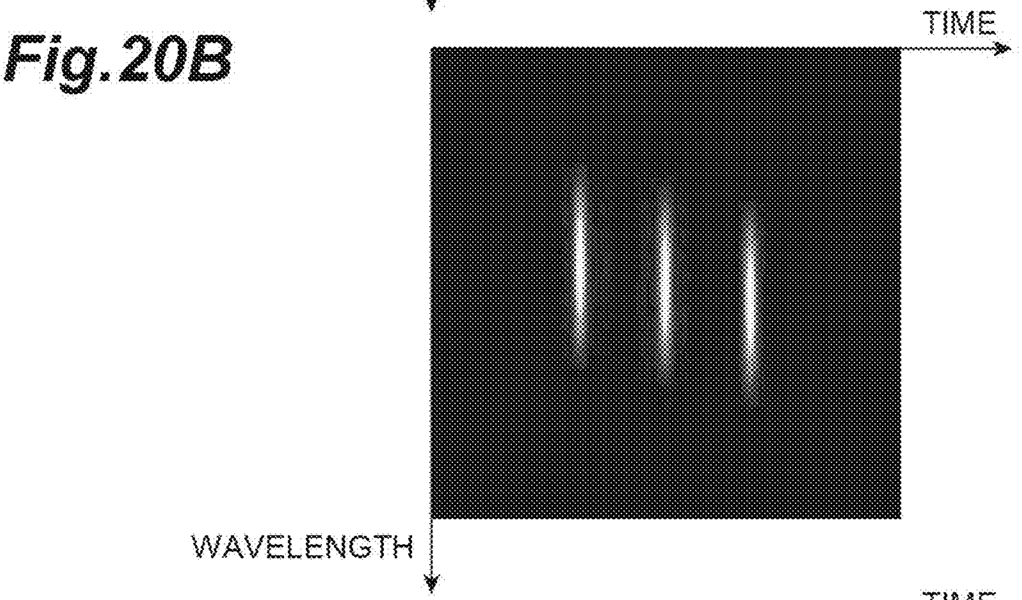
Figure 20C:
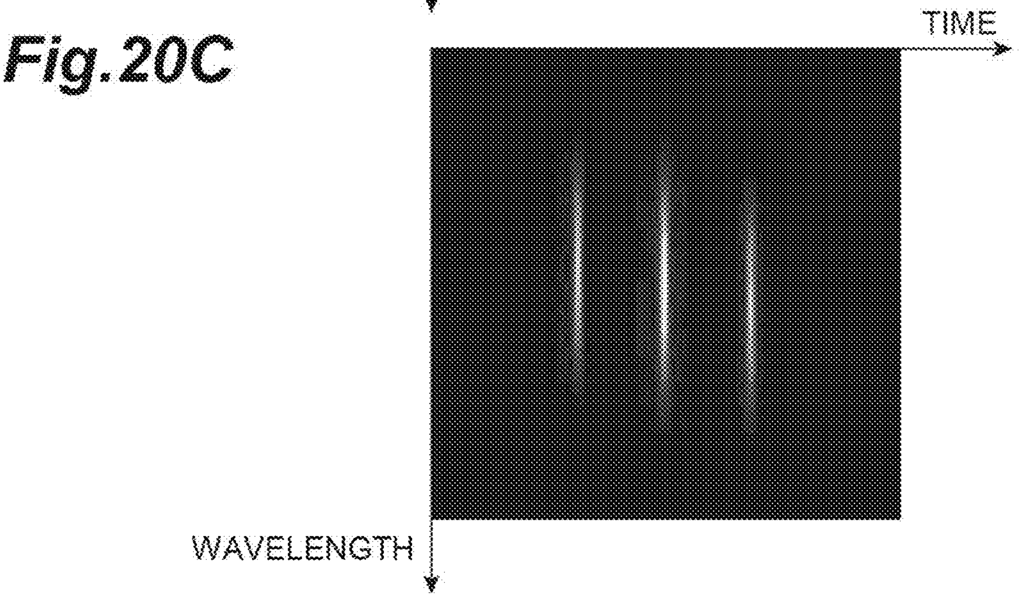

FIG. 19 is a graph showing the relationship between the number of repetitions N until the calculation results converge and the calculation accuracy (RMS value) for the design value, which is obtained by this practical example. The horizontal axis indicates the number of repetitions N, and the scale of the horizontal axis is expressed in logarithms. The vertical axis indicates RMS value. A G111 in the diagram shows the relationship obtained by the data generation method of the present embodiment. A graph G112 shows the relationship obtained by the data generation device described in Patent Literature 1. FIG. 20(*a*) shows an intensity spectrogram in the second cycle of repeated calculations in the data generation device 20 of the present embodiment. FIG. 20(*b*) shows an intensity spectrogram when the calculation results converge in the data generation device 20 of the present embodiment. FIG. 20(*c*) shows an intensity spectrogram when the calculation results converge in the data generation device described in Patent Literature 1.

Referring to FIG. 19, it can be seen that according to the data generation device 20 of the present embodiment, the calculation results converge with a significantly smaller number of repetitions N compared with the data generation device described in Patent Literature 1. The time required for calculation was 952 minutes in the data generation device described in Patent Literature 1, whereas the time required for calculation was 6.7 minutes in the data generation device 20 of the present embodiment. Referring to FIG. 19, it can be seen that the RMS value in the data generation device 20 of the present embodiment is much smaller than the RMS value in the data generation device described in Patent Literature 1. That is, according to the data generation device 20, the data generation method, and the data generation program of the present embodiment, the time required to calculate the spectral phase solution $\Phi_{result}(\omega)$, in other words, the time required to calculate the modulation data can be significantly shortened. In addition, the accuracy of calculating the spectral phase solution $\Phi_{result}(\omega)$, in other words, the accuracy of calculating modulation data, can be significantly improved.

As in the present embodiment, the first waveform function A2 of the Fourier transform unit 25 and the first transform step at the beginning of the repetition may be a waveform function related to the initial optical pulse $Pb_0$. The intensity spectrogram A43 may be an intensity spectrogram related to the optical pulse train Pb including a plurality of optical pulses $Pb_1$ to $Pb_3$ having time differences therebetween and having different center wavelengths. In this case, the center wavelength can be made different for each of the plurality of output pulses. Therefore, it is possible to apply the optical pulse train Pb to various devices such as a laser processing device, an ultra-high-speed imaging camera, or a terahertz wave generator.

Figure 21:
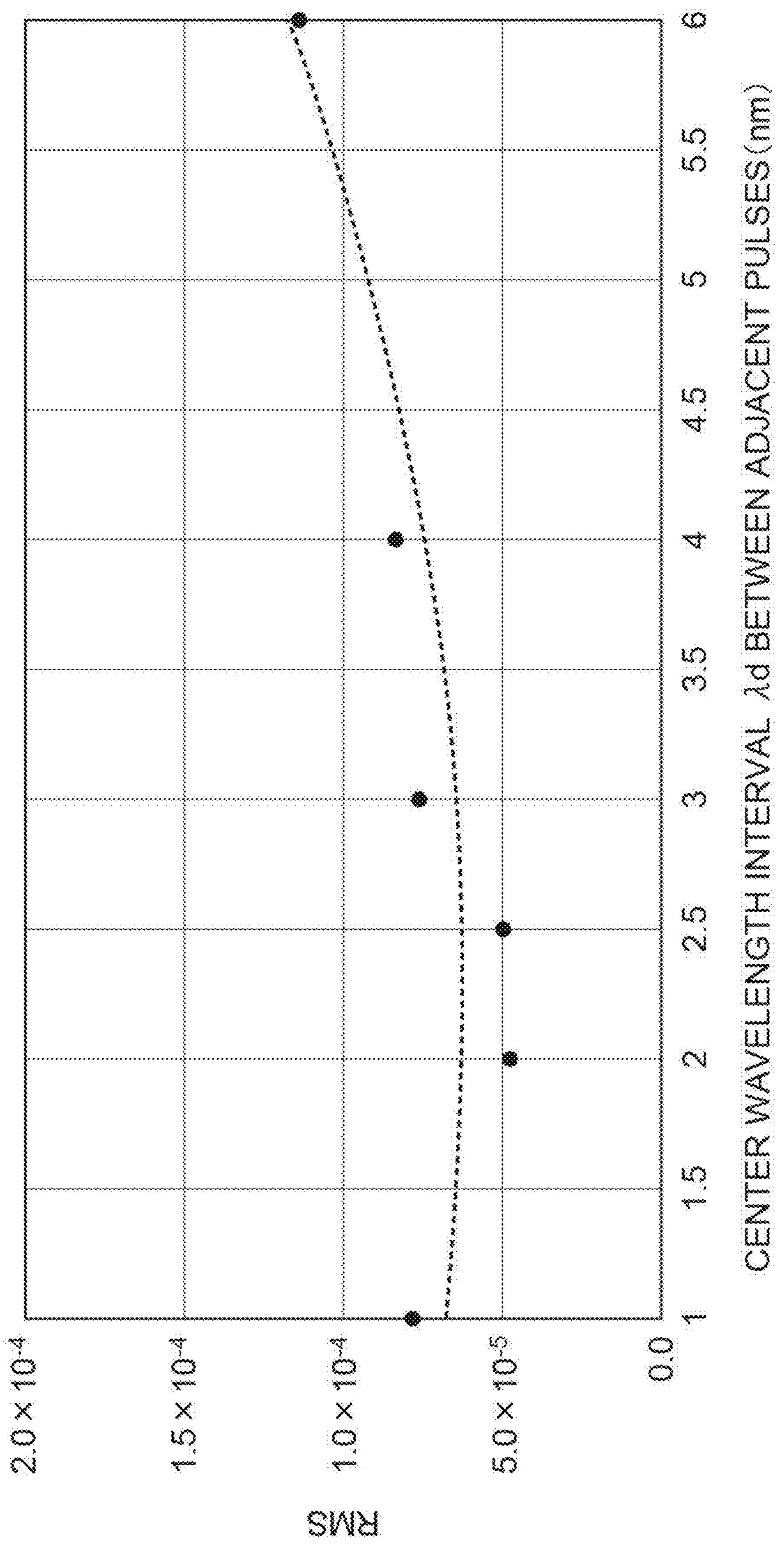
FIG. 21 is a graph showing the relationship between the center wavelength interval between adjacent optical pulses and the calculation accuracy for a design value.

Here, when generating the optical pulse train Pb, suitable values of the bandwidth (full width at half maximum) λs of each of the optical pulses $Pb_1$ to $Pb_3$ in the intensity spectrogram A43 and the center wavelength interval λd between adjacent optical pulses will be discussed. FIG. 21 is a graph showing an example of the relationship between the center wavelength interval λd (nm) between adjacent optical pulses and the calculation accuracy (RMS value) for the design value. In this example, the wavelength band λw of the optical pulse $Pb_0$ of the initial spectrum function A1 is 10 nm, the bandwidth λs of each of the optical pulses $Pb_1$ to $Pb_3$ is 10 nm, and the number of repetitions N is 50. The wavelength band λw of the optical pulse $Pb_0$ is equal to the wavelength band of the input beam La.

Referring to FIG. 21, the calculation accuracy for the design value depends on the center wavelength interval λd between adjacent optical pulses. Then, in a range in which the center wavelength interval λd is smaller than 5 nm, that is, (λw/2), the RMS value is smaller than $1.0\times10^{-4}$, and the calculation accuracy is sufficiently high. In addition, when the center wavelength interval λd is around 2.5 nm, that is, (λw/4), the RMS value is the minimum, and the calculation accuracy is the highest.

Figure 22:
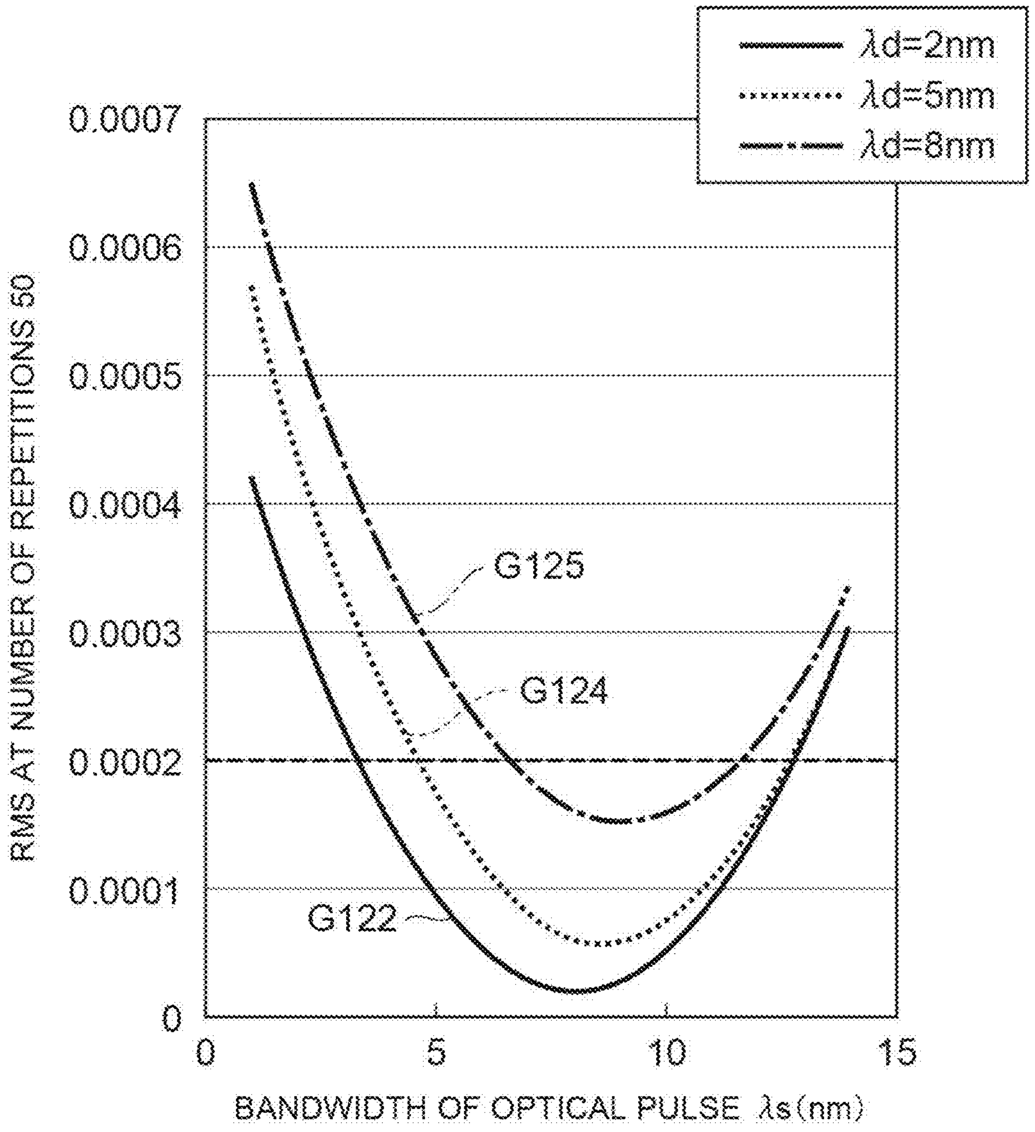
FIG. 22 is a graph showing the relationship between the optical pulse bandwidth, the center wavelength interval, and the calculation accuracy for a design value.
Figure 23:
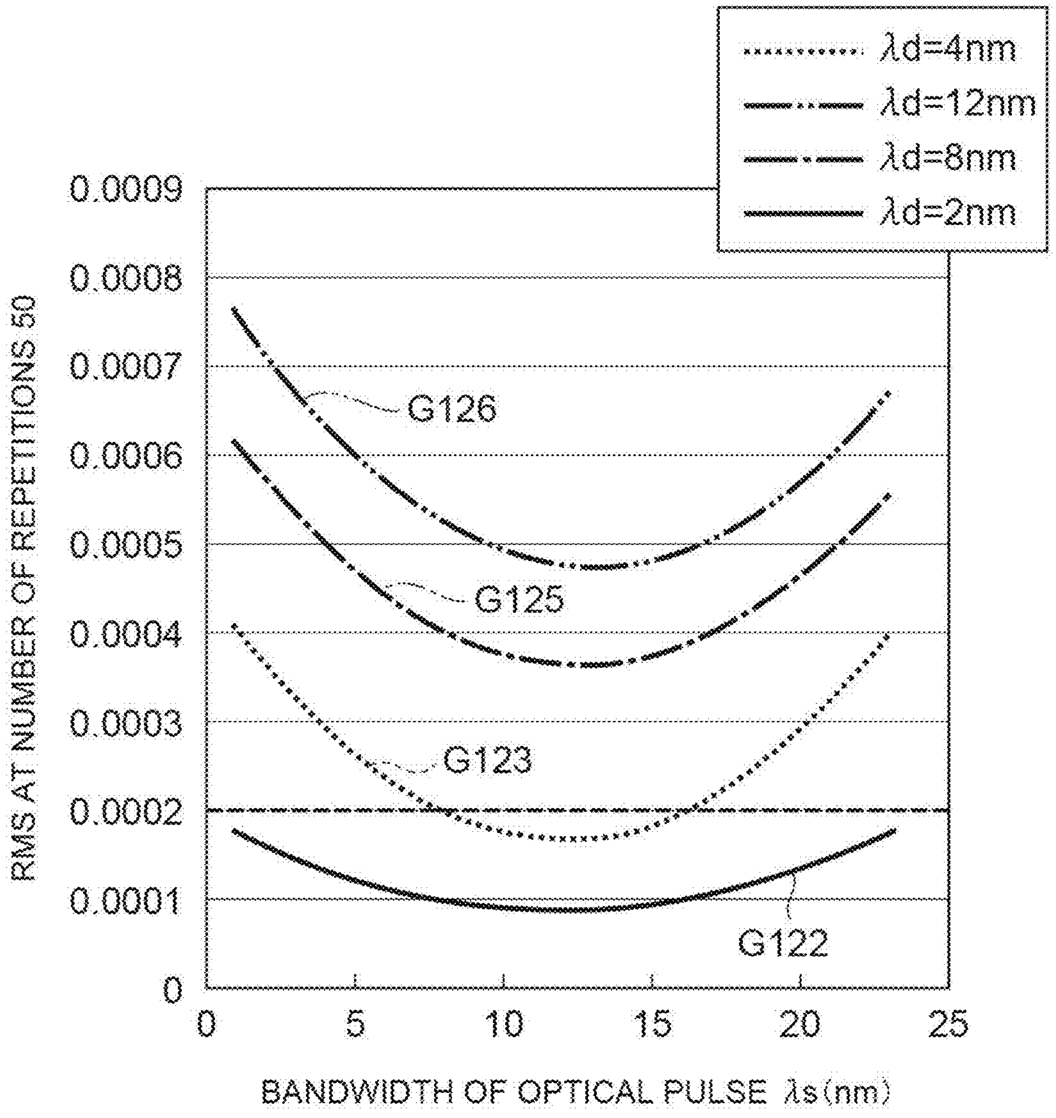
FIG. 23 is a graph showing the relationship between the optical pulse bandwidth, the center wavelength interval, and the calculation accuracy for a design value.
Figure 24:
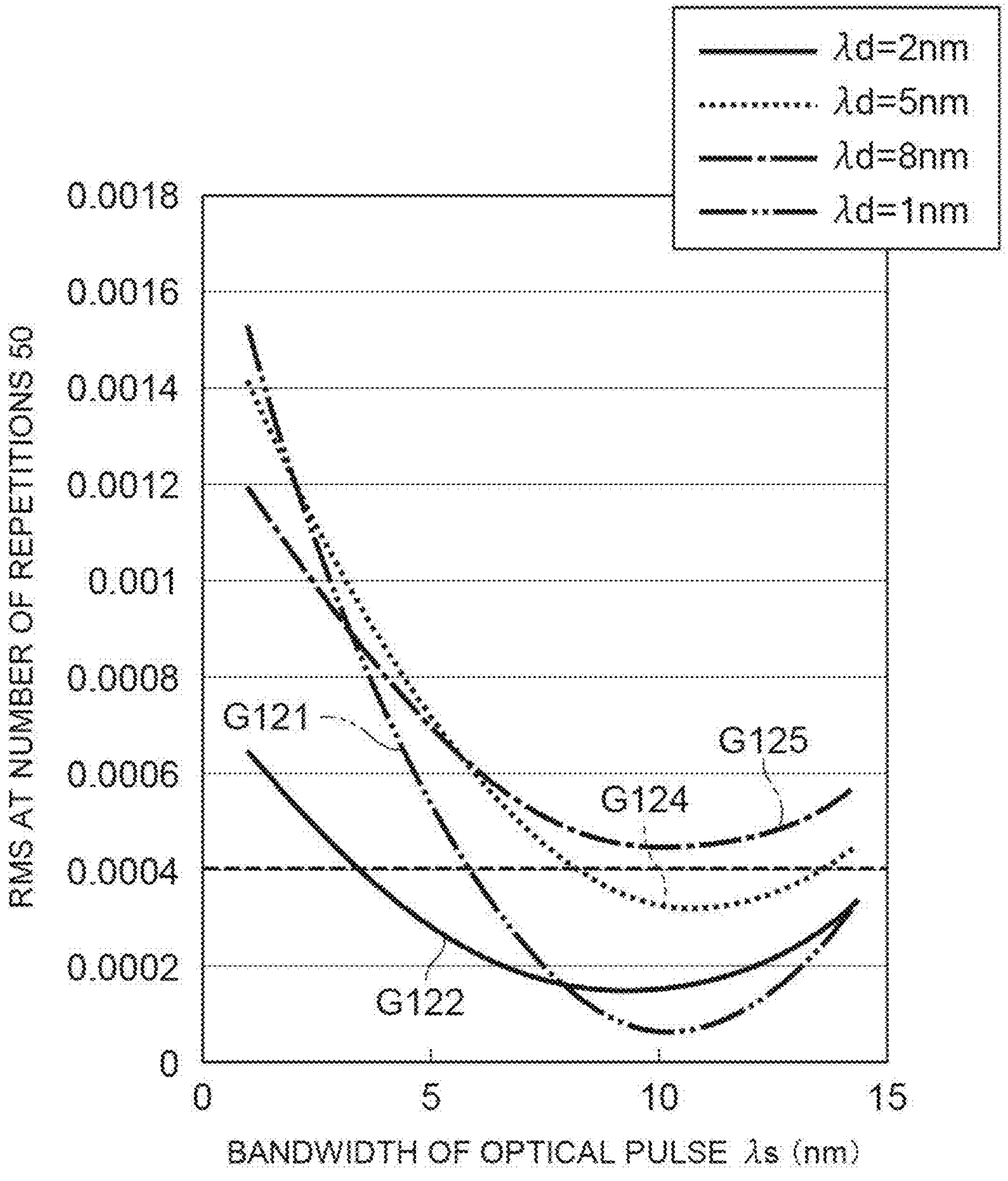
FIG. 24 is a graph showing the relationship between the optical pulse bandwidth, the center wavelength interval, and the calculation accuracy for a design value.

FIGS. 22, 23, and 24 are graphs showing the relationship among the bandwidth λs of each optical pulse, the center wavelength interval λd, and the calculation accuracy (RMS value) for the design value. FIG. 22 shows a case where the number of optical pulses included in the optical pulse train Pb is 3 and the bandwidth λw of the optical pulse $Pb_0$ of the first waveform function A2 at the beginning of the repetition is 10 nm. FIG. 23 shows a case where the number of optical pulses included in the optical pulse train Pb is 3 and the bandwidth λw is 20 nm. FIG. 24 shows a case where the number of optical pulses included in the optical pulse train Pb is 2 and the bandwidth λw is 10 nm. In FIGS. 22 to 24, the peak intensities of a plurality of optical pulses forming the optical pulse train Pb are equal. In FIGS. 22 to 24, curves G121 to G126 show cases where the center wavelength interval λd is 1 nm, 2 nm, 4 nm, 5 nm, 8 nm, and 12 nm, respectively. As shown in FIGS. 22 to 24, regardless of the center wavelength interval λd, the calculation accuracy for the design value depends on the bandwidth λs of each of the optical pulses $Pb_1$ to $Pb_3$. In addition, as the center wavelength interval λd decreases, the minimum value of the calculation accuracy decreases.

Figure 25:
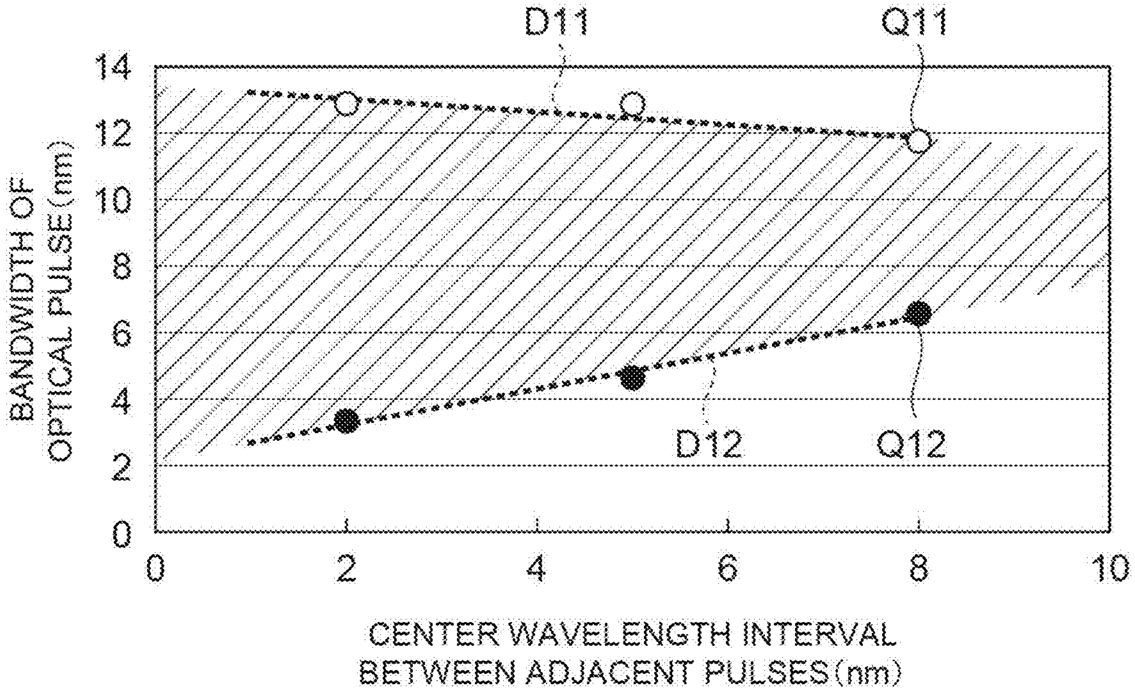
FIG. 25 is a graph showing a range in which the RMS value is $2\times10^{-4}$ or less for a combination of the bandwidth and the center wavelength interval, which is calculated from the graph of FIG. 22.

FIG. 25 is a graph showing a range in which the RMS value is $2\times10^{-4}$ or less for a combination of the bandwidth λs and the center wavelength interval λd, which is calculated from the graph of FIG. 22. In FIG. 25, a white circle plot Q11 is the upper limit value of the bandwidth λs at each center wavelength interval λd, and a straight line D11 is an approximate straight line of the plot Q11. A black circle plot Q12 is the lower limit value of the bandwidth λs at each center wavelength interval λd, and a straight line D12 is an approximate straight line of the plot Q12. The hatched area in FIG. 25 indicates a range in which the RMS value is $2\times10^{-4}$ or less. From this graph, when the number of optical pulses included in the optical pulse train Pb is 3 and the bandwidth λw is 10 nm, the ranges of the bandwidth λs and the center wavelength interval λd in which the RMS value is $2\times10^{-4}$ or less can be expressed as $(\lambda w/2)<\lambda s<\lambda w$ and $0<\lambda d<(4\cdot\lambda w/5)$, respectively.

Figure 26:
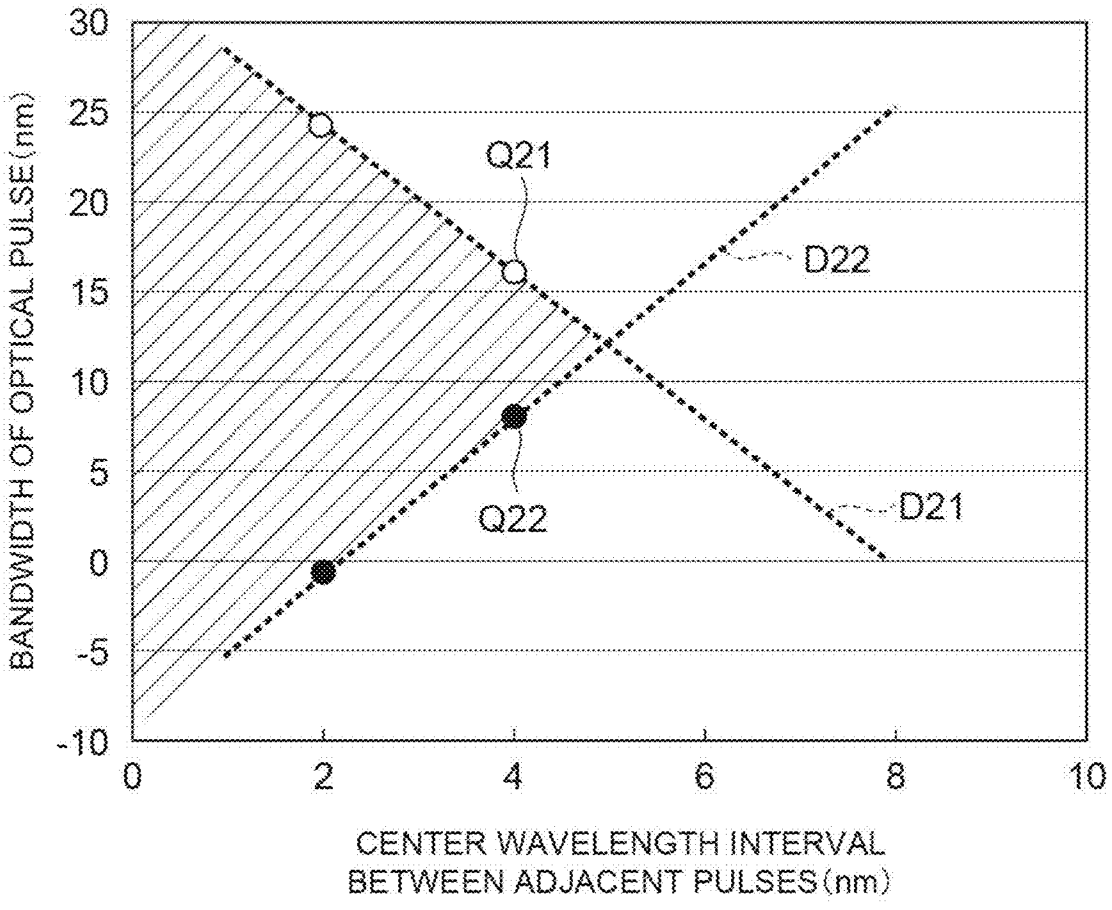
FIG. 26 is a graph showing a range in which the RMS value is $2\times10^{-4}$ or less for a combination of the bandwidth and the center wavelength interval, which is calculated from the graph of FIG. 23.

FIG. 26 is a graph showing a range in which the RMS value is $2\times10^{-4}$ or less for a combination of the bandwidth λs and the center wavelength interval λd, which is calculated from the graph of FIG. 23. In FIG. 26, a white circle plot Q21 is the upper limit value of the bandwidth λs at each center wavelength interval λd, and a straight line D21 is an approximate straight line of the plot Q21. A black circle plot Q22 is the lower limit value of the bandwidth λs at each center wavelength interval λd, and a straight line D22 is an approximate straight line of the plot Q22. The hatched area in FIG. 26 indicates a range in which the RMS value is $2\times10^{-4}$ or less. From this graph, when the number of optical pulses included in the optical pulse train Pb is 3 and the bandwidth λw is 20 nm, the ranges of the bandwidth λs and the center wavelength interval λd in which the RMS value is $2\times10^{-4}$ or less can be expressed as $(\lambda w/4)<\lambda s<\lambda w$ and $0<\lambda d<(\lambda w/5)$, respectively.

Figure 27:
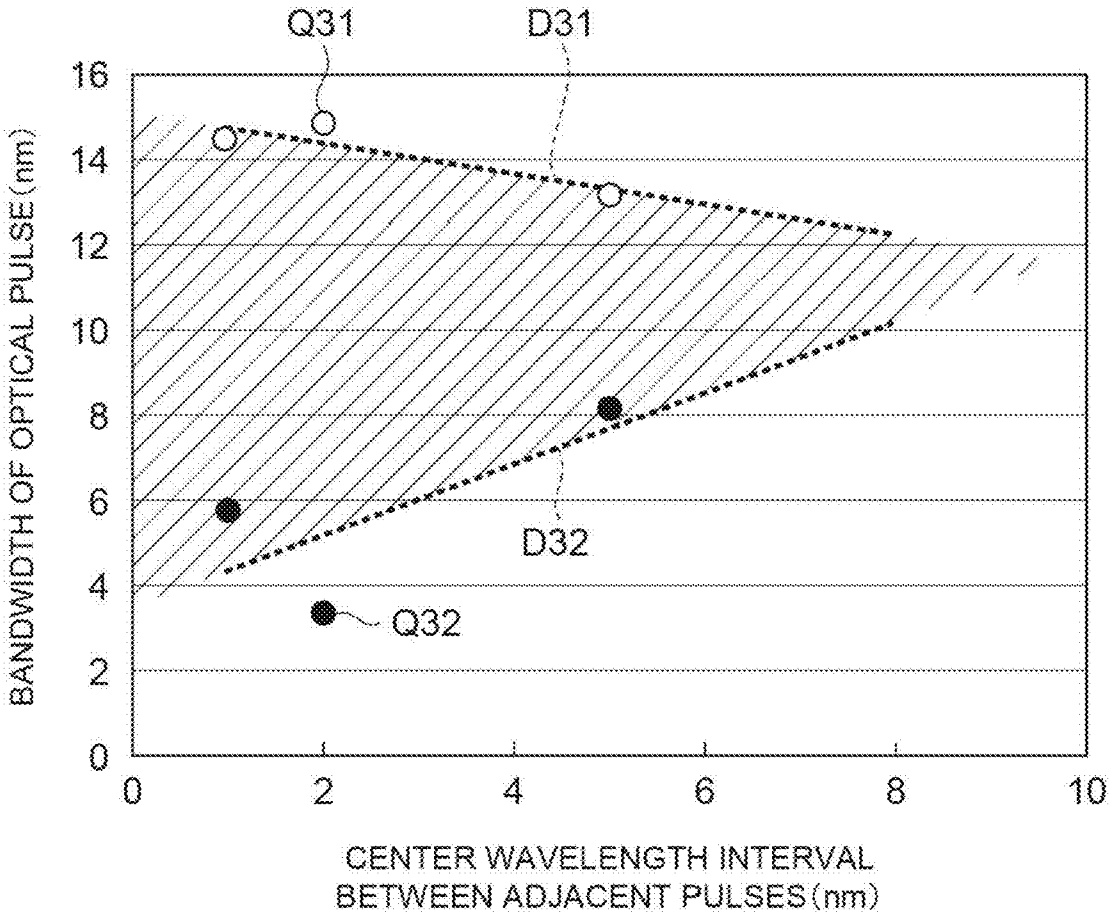
FIG. 27 is a graph showing a range in which the RMS value is $4\times10^{-4}$ or less for a combination of the bandwidth and the center wavelength interval, which is calculated from the graph of FIG. 24.

FIG. 27 is a graph showing a range in which the RMS value is $4\times10^{-4}$ or less for a combination of the bandwidth λs and the center wavelength interval λd, which is calculated from the graph of FIG. 24. In FIG. 27, a white circle plot Q31 is the upper limit value of the bandwidth λs at each center wavelength interval λd, and a straight line D31 is an approximate straight line of the plot Q31. A black circle plot Q32 is the lower limit value of the bandwidth λs at each center wavelength interval λd, and a straight line D32 is an approximate straight line of the plot Q32. The hatched area in FIG. 27 indicates a range in which the RMS value is $4\times10^{-4}$ or less. From this graph, when the number of optical pulses included in the optical pulse train Pb is 2 and the bandwidth λw is 10 nm, the ranges of the bandwidth λs and the center wavelength interval λd in which the RMS value is $4\times10^{-4}$ or less can be expressed as $(4\cdot\lambda w/5)<\lambda s<(6\cdot\lambda w/5)$ and $0<\lambda d<(4\cdot\lambda w/5)$, respectively.

Combining the above results, when the full width at half maximum of the wavelength band of beam (input beam La) input to the SLM 14 is λw, the intensity spectrogram A43 (target intensity spectrogram) is preferably set such that the full width at half maximum λs of the wavelength band of each of the plurality of optical pulses is larger than (λw/4) and smaller than (6·λw/5) and the center wavelength interval λd between the plurality of optical pulses is larger than 0 and smaller than (4·λw/5). In this case, the temporal waveforms of the plurality of generated optical pulses can be accurately approximated to the target temporal waveform.

[Generation of Target Intensity Spectrogram]

Figure 28:
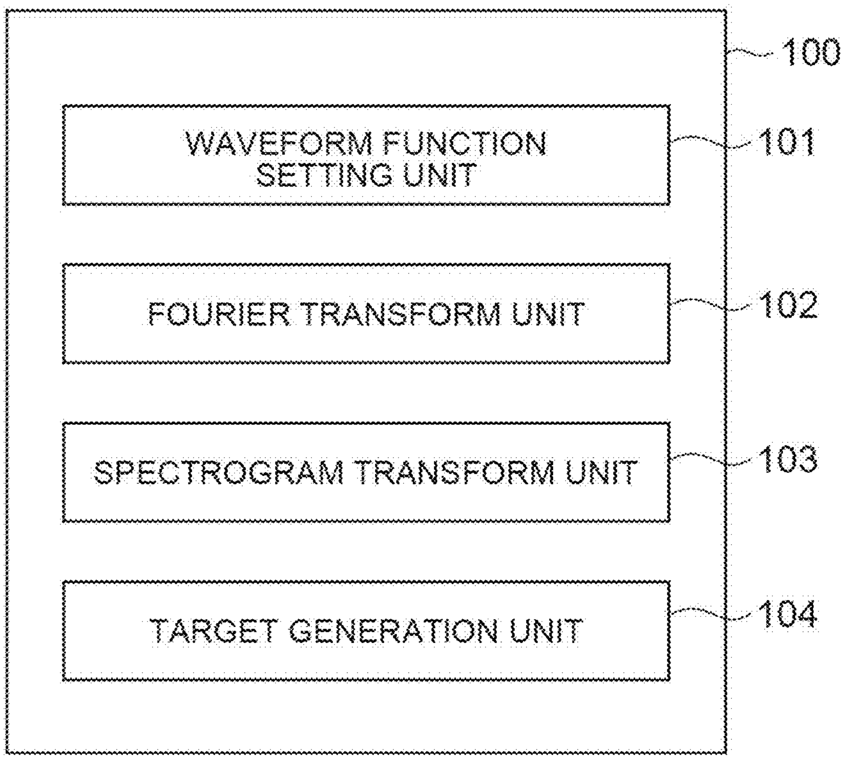
FIG. 28 is a block diagram showing the functional configuration of a device for generating a target intensity spectrogram.

Next, a device, a method, and a program for generating a target intensity spectrogram used to generate data for controlling the SLM 14 will be described. FIG. 28 is a block diagram showing the functional configuration of a device 100 for generating the intensity spectrogram A43. The device 100 generates the intensity spectrogram A43 (target intensity spectrogram) regarding the optical pulse train Pb including a plurality of optical pulses having time differences therebetween and having different center wavelengths, for example, the above-described optical pulses $Pb_1$ to $Pb_3$. As shown in FIG. 28, the device 100 includes a waveform function setting unit 101, a Fourier transform unit (fifth transform unit) 102, a spectrogram transform unit (sixth transform unit) 103, and a target generator 104. The device 100 may have the same hardware configuration as the data generation device 20 described above (see FIG. 8). In this case, the processor 61 of the computer can realize each function of the device 100 described above by using a target intensity spectrogram generation program. Therefore, the target intensity spectrogram generation program causes the processor 61 of the computer to operate as the waveform function setting unit 101, the Fourier transform unit 102, the spectrogram transform unit 103, and the target generator 104.

Figure 29A:
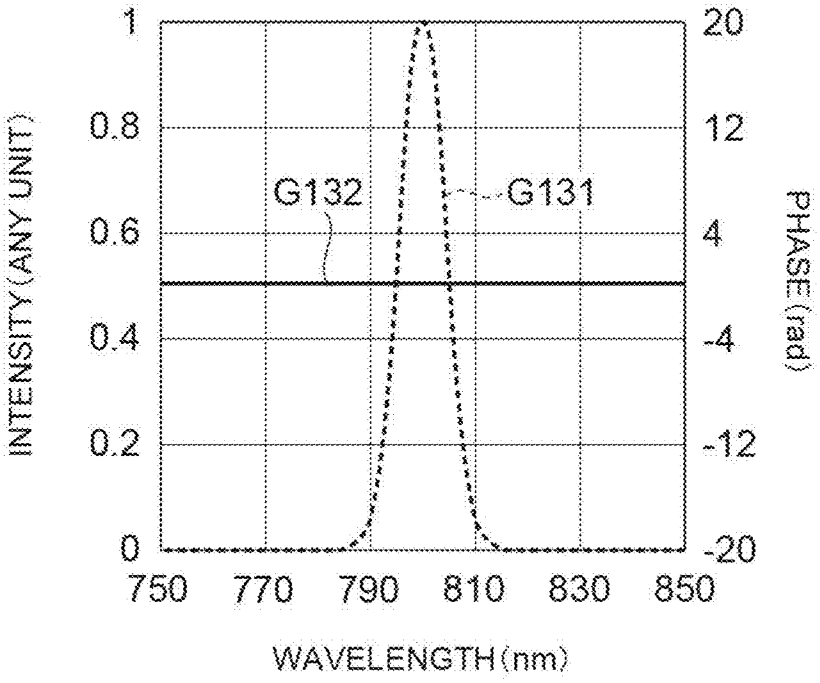
FIG. 29 includes (a) a graph showing a target waveform function for one optical pulse shown in FIG. 18, and (b) a graph showing a waveform function in the temporal domain generated from the target waveform function shown in (a) of FIG. 29.
Figure 29B:
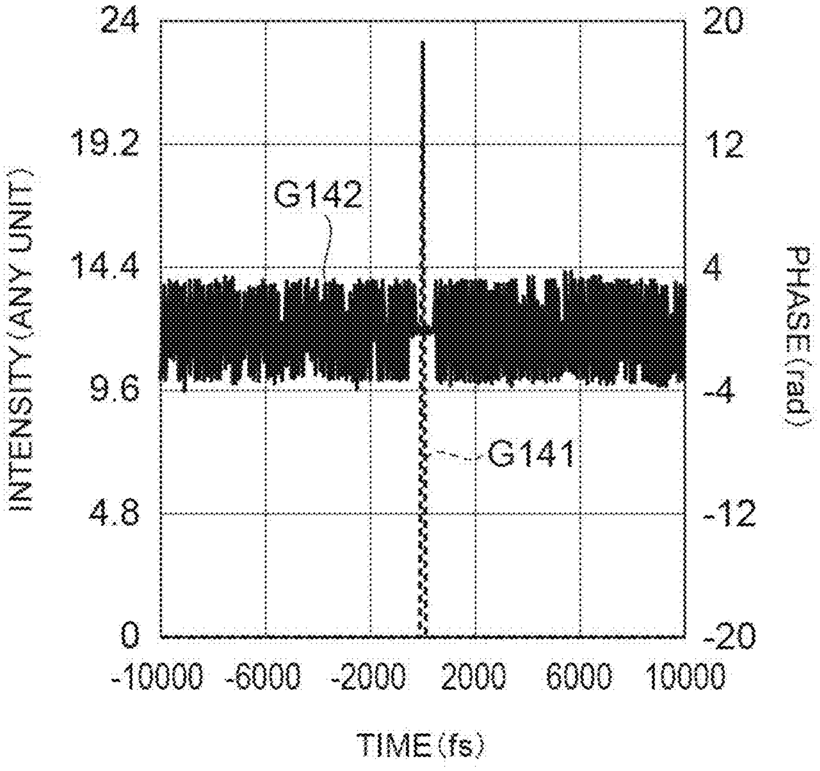

The waveform function setting unit 101 sets a target waveform function in the frequency domain, which includes an intensity spectrum function and a phase spectrum function, for each optical pulse. For example, the waveform function setting unit 101 sets a target waveform function for the optical pulse $Pb_1$, sets another target waveform function for the optical pulse $Pb_2$, and sets still another target waveform function for the optical pulse $Pb_3$. For example, the parameters of the target waveform function are as follows.

a) Shape (for example, Gaussian) of the intensity spectrum function of each optical pulse
b) Amount of spectral energy of the intensity spectrum function of each optical pulse
c) Bandwidth (full width at half maximum) As of the intensity spectrum function of each optical pulse
d) Center wavelength of the intensity spectrum function of each optical pulse
e) Phase spectrum function of each optical pulse When the spectral phase of each optical pulse is linear with respect to frequency, the slope of the linear function corresponds to the amount of time shift of each optical pulse. FIG. 29(*a*) is a graph showing, as an example of the target waveform function, an intensity spectrum function G131 and a phase spectrum function G132 of the target waveform function for the optical pulse $Pb_2$ shown in FIG. 18. In FIG. 29(*a*), the horizontal axis indicates wavelength (nm), and the vertical axis indicates the intensity value (any unit) of the intensity spectrum function G131 and the phase value (rad) of the phase spectrum function G132. This example is a target waveform function for the optical pulse $Pb_2$ located at the center among the three optical pulses $Pb_1$ to $Pb_3$ that are equally spaced in time from each other. Therefore, the slope of the phase spectrum function G132, that is, the amount of time shift, is zero.

The Fourier transform unit 102 transforms the target waveform function of each of the plurality of optical pulses into a waveform function (fifth waveform function) in the temporal domain including a temporal intensity waveform function and a temporal phase waveform function. FIG. 29(*b*) shows, as an example of the waveform function in the temporal domain, a temporal intensity waveform function G141 and a temporal phase waveform function G142 generated from the target waveform function shown in FIG. 29(*a*). In FIG. 29(*b*), the horizontal axis indicates time (fs), and the vertical axis indicates the intensity value (any unit) of the temporal intensity waveform function G141 and the phase value (rad) of the temporal phase waveform function G142.

Figure 30A:
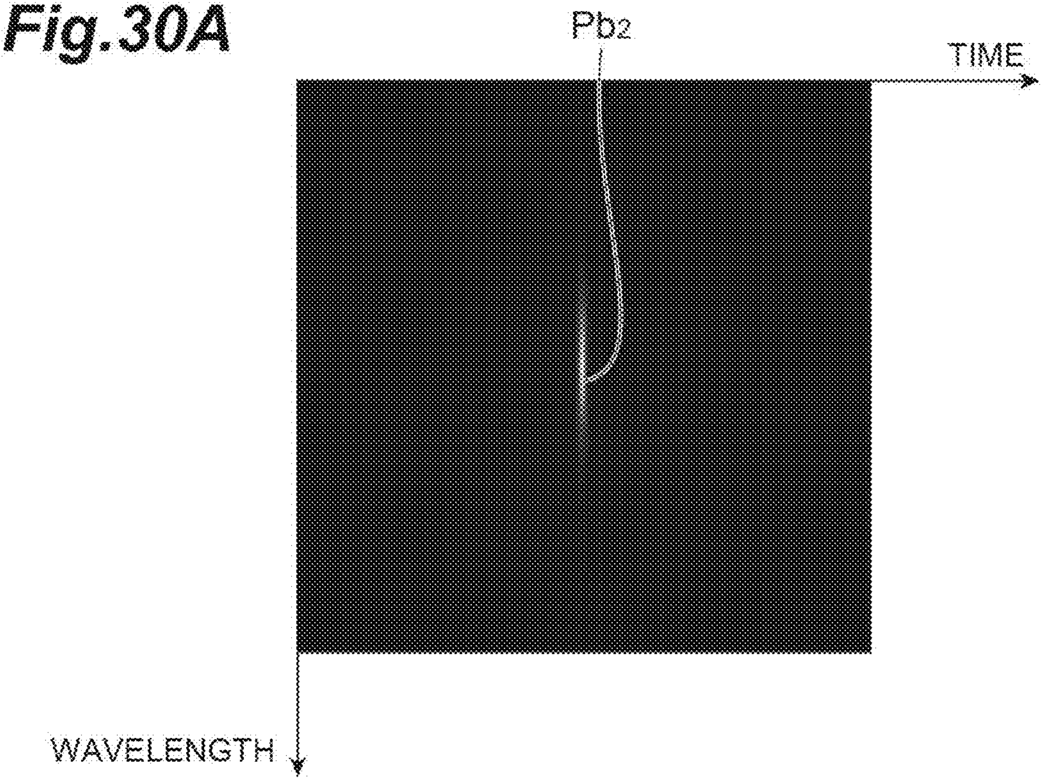
FIG. 30 includes (a) a diagram showing an intensity spectrogram generated from the waveform function shown in (b) of FIG. 29, and (b) a diagram showing a target intensity spectrogram obtained by superimposing intensity spectrograms for three optical pulses.
Figure 30B:
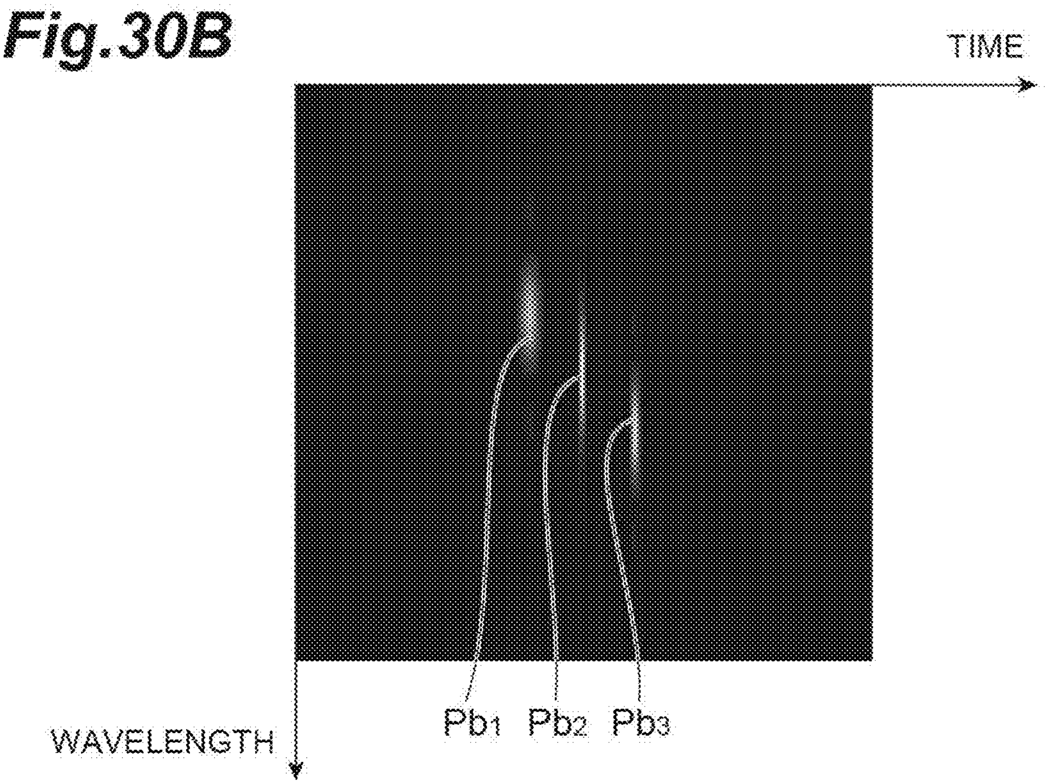

The spectrogram transform unit 103 generates an intensity spectrogram from the time-domain waveform function of each of the plurality of optical pulses. FIG. 30(*a*) is a diagram showing, as an example of the intensity spectrogram, an intensity spectrogram generated from the waveform function shown in FIG. 29(*b*). The intensity spectrogram generation method and the definition of the spectrogram are the same as those described in the spectrogram transform unit 26 of the spectrum design unit 22 described above. Also in the spectrogram transform unit 103, other time-frequency transforms such as wavelet transform may be used without being limited to the STFT.

The target generator 104 generates the intensity spectrogram A43 (target intensity spectrogram) by superimposing the intensity spectrograms of the plurality of optical pulses on each other. FIG. 30(*b*) is a diagram showing, as an example, an intensity spectrogram obtained by superimposing intensity spectrograms for the three optical pulses $Pb_1$ to $Pb_3$ on each other. The target generator 104 may multiply the intensity spectrogram obtained by superimposing the intensity spectrograms of the plurality of optical pulses by a correction coefficient. The correction coefficient is, for example, a coefficient for approximating the spectral intensity distribution of the generated intensity spectrogram A43 to the spectral intensity distribution of the optical pulse of the input beam La.

Figure 31:
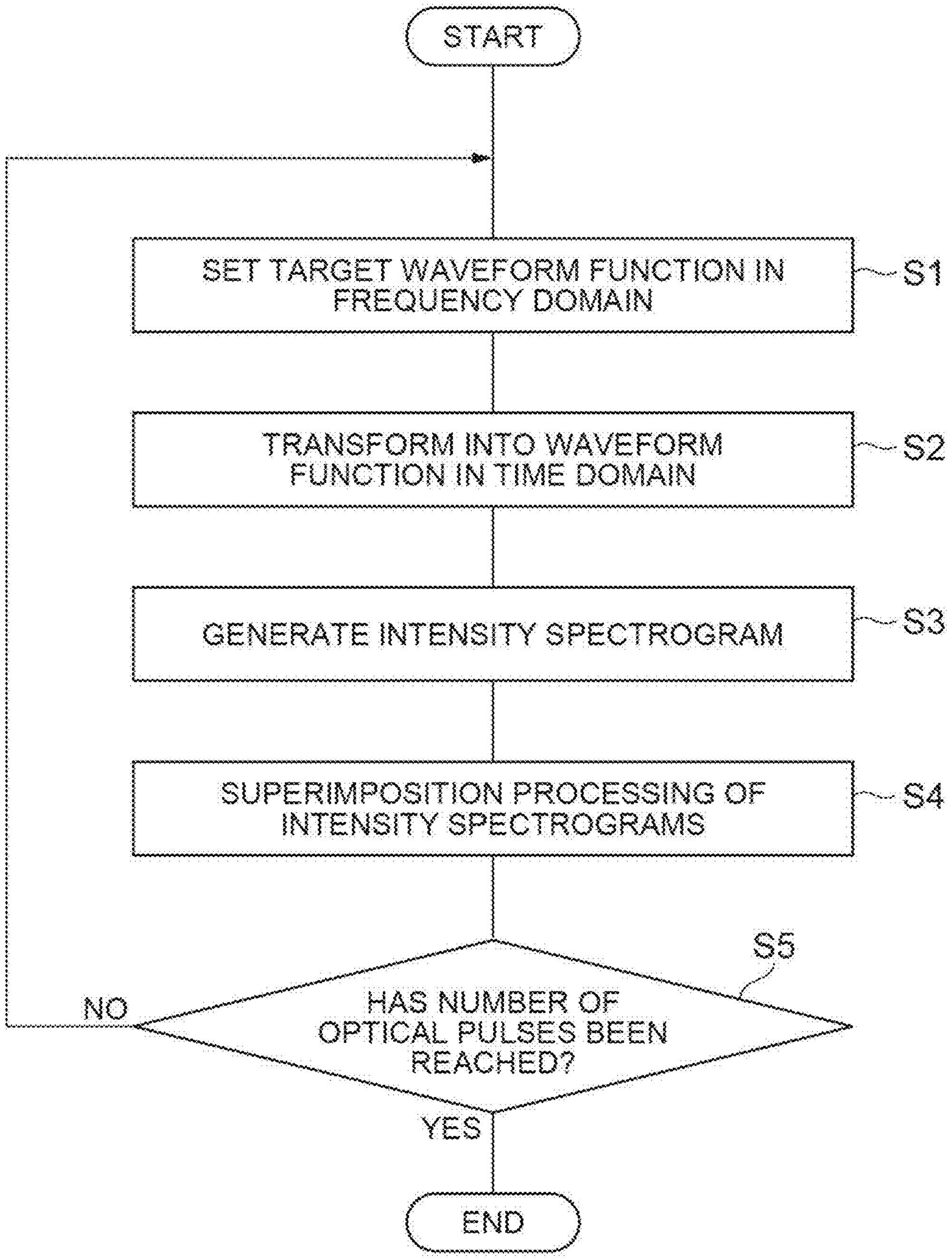
FIG. 31 is a flowchart showing a method for generating a target intensity spectrogram.

FIG. 31 is a flowchart showing a method for generating the intensity spectrogram A43. The target intensity spectrogram generation program of the present embodiment causes a computer to execute the following steps.

In waveform function setting step S1, a target waveform function in the frequency domain including an intensity spectrum function and a phase spectrum function is set for one optical pulse among a plurality of optical pulses. In Fourier transform step (fifth transform step) S2, the target waveform function of the one optical pulse is transformed into a waveform function (fifth waveform function) in the temporal domain including a temporal intensity waveform function and a temporal phase waveform function. In spectrogram transform step (sixth transform step) S3, an intensity spectrogram is generated from the waveform function in the temporal domain generated in the Fourier transform step S2. In target generation step S4, the intensity spectrogram generated in the spectrogram transform step S3 is superimposed on the target intensity spectrogram. The above-described waveform function setting step S1, Fourier transform step S2, spectrogram transform step S3, and target generation step S4 are repeated by the same number of repetitions as the number of optical pulses (step S5). As a result, the intensity spectrogram A43 is generated. Without being limited to this example, for example, processes for a plurality of optical pulses may be performed at once in each of the waveform function setting step S1, Fourier transform step S2, and spectrogram transform step S3, and then the plurality of generated intensity spectrograms may be superimposed in the target generation step S4.

According to the device 100, method, and program for generating the intensity spectrogram A43 described above, it is possible to appropriately generate the intensity spectrogram A43 for making the center wavelength different for each of the plurality of pulses included in the optical pulse train Pb.

The data generation device, the light control device, the target intensity spectrogram generation device, the data generation method, the target intensity spectrogram generation method, the data generation program, and the target intensity spectrogram generation program according to the present disclosure are not limited to the embodiment described above, and can be modified in various ways. For example, although the case of generating an optical pulse train including a plurality of optical pulses having time differences therebetween and having different center wavelengths has been mainly described in the above embodiment, the device, method, and program according to the present disclosure are effective even when generating an optical pulse train including a plurality of optical pulses having time differences therebetween and having the same center wavelength. The device, method, and program according to the present disclosure are also effective in controlling the waveform of light other than the optical pulse train, such as when shaping the temporal waveform of a single optical pulse.

While the principles of the present invention have been illustrated and described in a preferred embodiment, it is recognized by those skilled in the art that the present invention can be changed in arrangement and detail without departing from such principles. The present invention is not limited to the specific configuration disclosed in the present embodiment. Therefore, we claim all modifications and changes that come within the scope and spirit of the claims.

REFERENCE SIGNS LIST

1: light control device, 2: light source, 3: optical waveform control unit, 12: diffraction grating, 13: lens, 14: spatial light modulator (SLM), 15: lens, 16: diffraction grating, 17: modulation surface, 17*a*: modulation region, 20: data generation device, 21: spectrogram setting unit, 22: spectrum design unit, 23: data generator, 25: Fourier transform unit (first transform unit), 26: spectrogram transform unit (second transform unit), 27: spectrogram replacement unit, 28: spectrogram inverse transform unit (third transform unit), 29: inverse Fourier transform unit (fourth transform unit), 61: processor (CPU), 62: ROM, 63: RAM, 64: input device, 65: output device, 66: communication module, 67: auxiliary storage device, 100: device, 101: waveform function setting unit, 102: Fourier transform unit (fifth transform unit), 103: spectrogram transform unit (sixth transform unit), 104: target generator, A1: initial spectrum function, A2: first waveform function, A3: second waveform function, A5: third waveform function, A6: fourth waveform function, A41: intensity spectrogram, A42: phase spectrogram, A43: intensity spectrogram, L1: beam, L2: modulated beam, La: input beam, Lb: output beam, Pb: optical pulse train, $Pb_0$, $Pb_1$ to $Pb_3$: optical pulse, Pd: optical pulse train, $Pd_1$ to $Pd_3$: optical pulse, S1: waveform function setting step, S2: Fourier transform step, S3: spectrogram transform step, S4: target generation step, SC: control signal.

The invention claimed is:

1. A data generation device for controlling a spatial light modulator, the data generation device comprising:

a first transform unit configured to transform a first waveform function in a frequency domain including an intensity spectrum function and a phase spectrum function into a second waveform function in a temporal domain including a temporal intensity waveform function and a temporal phase waveform function;

a second transform unit configured to transform the second waveform function into an intensity spectrogram and a phase spectrogram;

a spectrogram replacement unit configured to replace the intensity spectrogram with a target intensity spectrogram generated in advance and constrains the phase spectrogram;

a third transform unit configured to transform the intensity spectrogram after replacement and the phase spectrogram after constraint into a third waveform function in the temporal domain including a temporal intensity waveform function and a temporal phase waveform function;

a fourth transform unit configured to transform the third waveform function into a fourth waveform function in the frequency domain including an intensity spectrum function and a phase spectrum function; and a data generator configured to generate data, wherein the first transform unit, the second transform unit, the spectrogram replacement unit, the third transform unit, and the fourth transform unit repeatedly perform their operations in this order while replacing the phase spectrum function of the first waveform function with the phase spectrum function of the fourth waveform function, and the data generator generates the data based on the phase spectrum function of the fourth waveform function obtained after repeated operations of the first transform unit, the second transform unit, the spectrogram replacement unit, the third transform unit, and the fourth transform unit.

2. The data generation device according to claim 1, wherein the first waveform function of the first transform unit at beginning of the repeated operations is a waveform function related to an initial optical pulse, and the target intensity spectrogram is an intensity spectrogram related to an optical pulse train including a plurality of optical pulses having time differences therebetween and having different center wavelengths.

3. The data generation device according to claim 2, wherein, when a full width at half maximum of a wavelength band of beam input to the spatial light modulator is λw, the target intensity spectrogram is set such that a full width at half maximum λs of a wavelength band of each of the plurality of optical pulses is larger than (λw/4) and smaller than (6·λw/5) and a center wavelength interval Ad between the plurality of optical pulses is larger than 0 and smaller than (4·λw/5).

4. A light control device, comprising:

a light source configured to output input beam;

a spectral element configured to split the input beam;

a spatial light modulator configured to modulate a spectral phase of the input beam after splitting and output modulated beam; and an optical system configured to multiplex wavelength components of the modulated beam, wherein the spatial light modulator modulates one or both of the spectral phase or a spectral intensity of the input beam based on the data generated by the data generation device according to claim 1.

5. A target intensity spectrogram generation device, comprising:

a waveform function setting unit configured to set a target waveform function in a frequency domain including an intensity spectrum function and a phase spectrum function for each optical pulse of an optical pulse train including a plurality of optical pulses having time differences therebetween and having different center wavelengths;

a fifth transform unit configured to transform the target waveform function of each of the plurality of optical pulses into a fifth waveform function in a temporal domain including a temporal intensity waveform function and a temporal phase waveform function;

a sixth transform unit configured to generate an intensity spectrogram from the fifth waveform function of each of the plurality of optical pulses; and a target generator configured to generate a target intensity spectrogram by superimposing intensity spectrograms of the plurality of optical pulses, wherein the target intensity spectrogram is used to generate data for controlling a spatial light modulator.

6. A data generation method for controlling a spatial light modulator, the data generation method comprising:

performing a first transform of transforming a first waveform function in a frequency domain including an intensity spectrum function and a phase spectrum function into a second waveform function in a temporal domain including a temporal intensity waveform function and a temporal phase waveform function;

performing a second transform of transforming the second waveform function into an intensity spectrogram and a phase spectrogram;

replacing the intensity spectrogram with a target intensity spectrogram generated in advance and constraining the phase spectrogram;

performing a third transform of transforming the intensity spectrogram after replacement and the phase spectrogram after constraint into a third waveform function in the temporal domain including a temporal intensity waveform function and a temporal phase waveform function;

performing a fourth transform of transforming the third waveform function into a fourth waveform function in the frequency domain including an intensity spectrum function and a phase spectrum function; and performing a data generation of generating data, wherein the first transform, the second transform, the third transform, and the fourth transform are repeatedly performed in this order while replacing the first waveform function in the first transform with the fourth waveform function in the fourth transform, and in the data generation, the data is generated based on the phase spectrum function of the fourth waveform function obtained after repetition of the first transform, the second transform, the third transform, and the fourth transform.

7. The data generation method according to claim 6, wherein the first waveform function in the first transform at beginning of the repetition is a waveform function related to an initial optical pulse, and the target intensity spectrogram is an intensity spectrogram related to an optical pulse train including a plurality of optical pulses having time differences therebetween and having different center wavelengths.

8. The data generation method according to claim 7, wherein, when a full width at half maximum of a wavelength band of beam input to the spatial light modulator is λw, the target intensity spectrogram is set such that a full width at half maximum λs of a wavelength band of each of the plurality of optical pulses is larger than (λw/4) and smaller than (6·λw/5) and a center wavelength interval Ad between the plurality of optical pulses is larger than 0 and smaller than (4·λw/5).

9. A target intensity spectrogram generation method, comprising:

setting a target waveform function in a frequency domain including an intensity spectrum function and a phase spectrum function for each optical pulse of an optical pulse train including a plurality of optical pulses having time differences therebetween and having different center wavelengths;

performing a fifth transform of transforming the target waveform function of each of the plurality of optical pulses into a fifth waveform function in a temporal domain including a temporal intensity waveform function and a temporal phase waveform function;

performing a sixth transform of generating an intensity spectrogram from the fifth waveform function of each of the plurality of optical pulses; and performing a target generation of generating a target intensity spectrogram by superimposing intensity spectrograms of the plurality of optical pulses, wherein the target intensity spectrogram is used to generate data for controlling a spatial light modulator.

10. A data generation program for controlling a spatial light modulator, the data generation program causing a computer to execute:

performing a first transform of transforming a first waveform function in a frequency domain including an intensity spectrum function and a phase spectrum function into a second waveform function in a temporal domain including a temporal intensity waveform function and a temporal phase waveform function;

performing a second transform of transforming the second waveform function into an intensity spectrogram and a phase spectrogram;

replacing the intensity spectrogram with a target intensity spectrogram generated in advance and constraining the phase spectrogram;

performing a third transform of transforming the intensity spectrogram after replacement and the phase spectrogram after constraint into a third waveform function in the temporal domain including a temporal intensity waveform function and a temporal phase waveform function;

performing a fourth transform of transforming the third waveform function into a fourth waveform function in the frequency domain including an intensity spectrum function and a phase spectrum function; and performing a data generation of generating data, wherein the first transform, the second transform, the third transform, and the fourth transform are repeatedly performed in this order while replacing the first waveform function in the first transform with the fourth waveform function in the fourth transform, and in the data generation, the data is generated based on the phase spectrum function of the fourth waveform function obtained after repetition of the first transform, the second transform, the third transform, and the fourth transform.

11. The data generation program according to claim 10, wherein the first waveform function in the first transform at beginning of the repetition is a waveform function related to an initial optical pulse, and the target intensity spectrogram is an intensity spectrogram related to an optical pulse train including a plurality of optical pulses having time differences therebetween and having different center wavelengths.

12. The data generation program according to claim 11, wherein, when a full width at half maximum of a wavelength band of beam input to the spatial light modulator is λw, the target intensity spectrogram is set such that a full width at half maximum λs of a wavelength band of each of the plurality of optical pulses is larger than (λw/4) and smaller than (6·λw/5) and a center wavelength interval Ad between the plurality of optical pulses is larger than 0 and smaller than (4·λw/5).

13. A target intensity spectrogram generation program causing a computer to execute:

setting a target waveform function in a frequency domain including an intensity spectrum function and a phase spectrum function for each optical pulse of an optical pulse train including a plurality of optical pulses having time differences therebetween and having different center wavelengths;

performing a fifth transform of transforming the target waveform function of each of the plurality of optical pulses into a fifth waveform function in a temporal domain including a temporal intensity waveform function and a temporal phase waveform function;

performing a sixth transform of generating an intensity spectrogram from the fifth waveform function of each of the plurality of optical pulses; and performing a target generation of generating a target intensity spectrogram by superimposing intensity spectrograms of the plurality of optical pulses, wherein the target intensity spectrogram is used to generate data for controlling a spatial light modulator.

* * * * *